US012750412B2

(12) United States Patent
Kim et al.

(10) Patent No.: US 12,750,412 B2
(45) Date of Patent: Sep. 29, 2026

(54) NETWORK ADAPTER-BASED SMART STREAMING FRONT-END FOR COMPUTING DEVICE

(71) Applicant: Microsoft Technology Licensing, LLC, Redmond, WA (US)

(72) Inventors: Donghwi Kim, Kirkland, WA (US); Colin Roman Donahue, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 19 days.

(21) Appl. No.: 18/674,210

(22) Filed: May 24, 2024

(65) Prior Publication Data

US 2025/0365336 A1 Nov. 27, 2025

(51) Int. Cl.
*H04L 65/75* (2022.01)
*G06F 1/3296* (2019.01)

(52) U.S. Cl.
CPC ............ *H04L 65/75* (2022.05); *G06F 1/3296* (2013.01)

(58) Field of Classification Search
CPC ............................... H04L 65/75; G06F 1/3296
See application file for complete search history.

(56) References Cited

U.S. PATENT DOCUMENTS 9,866,785 B2 * 1/2018 Strasser ........... H04N 21/44231
10,366,669 B2 * 7/2019 Bae ........................ G09G 5/395
10,484,690 B2 * 11/2019 Luo ...................... H04N 19/177
12,056,136 B2 * 8/2024 Unnikrishnan ......... G06F 16/53
2009/0046205 A1 2/2009 Strasser
2012/0206461 A1 8/2012 Wyatt
2014/0098113 A1 4/2014 Sabony
2014/0233629 A1 8/2014 Lipman
(Continued)

FOREIGN PATENT DOCUMENTS

CN 102566910 A 7/2012
KR 101263706 B1 5/2013

OTHER PUBLICATIONS

International Search Report and Written Opinion received for PCT Application No. PCT/US2025/016944, mailed on Jun. 4, 2025, 12 pages.

*Primary Examiner* — Nazia Naoreen
(74) *Attorney, Agent, or Firm* — Weaver IP L.L.C.

(57) ABSTRACT

Systems, methods, devices, and computer readable storage media described herein provide network adapter-based smart streaming front-end for computing devices. In an aspect, a network adapter separate from and communicatively coupled to a processor receives a first graphic data frame and transmits it to the processor. The network adapter receives a second graphic data frame and determines a level of similarity between a portion of the second graphic data frame and a corresponding portion of the first graphic data frame satisfies a threshold condition. Responsive to the determination, the network adapter prevents transmission of at least the portion of the second graphic data frame. In a further aspect, the network adapter transmits a different portion of the second graphic data frame. In an alternative aspect, a network adapter of a source device selectively transmits and prevents transmission of portions of graphic data frames to a remotely located computing device.

20 Claims, 10 Drawing Sheets

(56) References Cited

U.S. PATENT DOCUMENTS

| | | | | |
|---|---|---|---|---|
| 2014/0267042 | A1 | 9/2014 | Burr | |
| 2017/0322612 | A1 | 11/2017 | Beuchat | |
| 2021/0271287 | A1 | 9/2021 | Jose | |
| 2022/0187898 | A1 | 6/2022 | Bakalash | |
| 2022/0301525 | A1* | 9/2022 | Nidamanuri | G09G 5/18 |

* cited by examiner

NETWORK ADAPTER-BASED SMART STREAMING FRONT-END FOR COMPUTING DEVICE

BACKGROUND

Cloud-based systems may be utilized to host computing resources and provide various services to users. For instance, an implementation cloud-based system can provide a desktop streaming service that enables a front-end of a computing device to stream a user's desktop from a remotely located device over a network. This enables a user to access applications, settings, and other content from a cloud service provider to (e.g., any) of their computing devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments are described herein for providing a network adapter-based smart streaming front-end for a computing device. For instance, a network adapter separate from and communicatively coupled to a processing unit of a computing device selectively provides and prevents transmission of graphic data frames to the processing unit. In an aspect, the network adapter receives a first graphic data frame and transmits it to the processing unit. The network adapter receives a second graphic data frame subsequent to the processing unit entering a low power state. The network adapter determines a level of similarity between the first and second graphic data frames satisfies a threshold condition. Responsive to the determination, the network adapter prevents transmission of at least the portion of the second graphic data frame.

In a further aspect, the network adapter transmits a different portion of the second graphic data frame with a level of similarity to a corresponding different portion of the first graphic data frame that fails to satisfy the threshold condition.

In some implementations, the network adapter determines the level of similarity by comparing pixels of the first and second graphic data frames, comparing hashes of the first and second graphic data frames, utilizing a ML model to encode graphic data frames, and/or comparing portions of the first and second graphic data frames.

In an alternative aspect, a network adapter of a source device selectively transmits and prevents transmission of portions of graphic data frames to a remotely located computing device.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
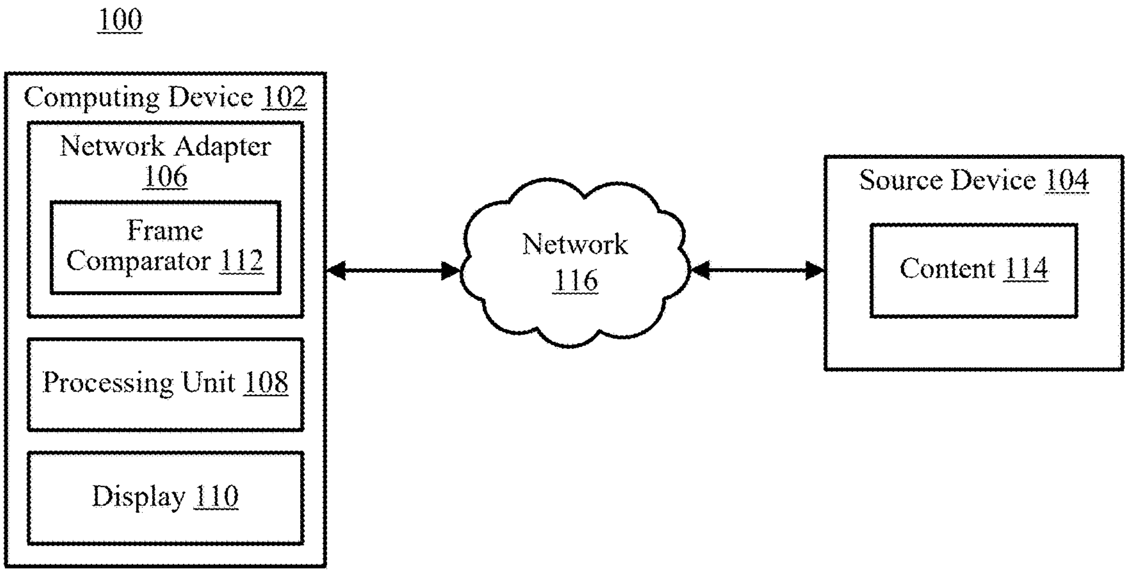
FIG. 1 shows a block diagram of a system for providing a network adapter-based smart streaming front-end for a computing device, in accordance with an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Embodiments for Network Adapter-Based Smart Streaming

Embodiments of the present disclosure relate to streaming content in a cloud-based system. Cloud-based systems are utilized to host resources and provide services to users and computing devices. In some implementations, a cloud-based system streams content to a computing device coupled to the cloud-based system over a network. Examples of content include, but are not limited to, media (e.g., music, movies, videogames, pictures, etc.), applications (e.g., a front-end component to a back-end application), desktops (e.g., a remote personal computer (PC) desktop), and/or any other type of content that a cloud-based system may be configured to host and/or otherwise provide access to a remotely located computing device. In content streaming implementations, the remotely located computing device (e.g., a user's computing device) is "downstream" from the source device (e.g., the cloud service provider device or the content source provider device). The downstream computing device maintains an active network connection in order to obtain new content over the network from the source device. In some cases, the network connection is maintained irrespective of user activity and other interaction (e.g., irrespective of whether or not the user is actively interacting with an input device (e.g., a touch pad, a mouse, a keyboard, a joystick, or another type of input device) of the computing device). The active network connection consumes power and compute resources, even if the computing device is not being interacted with. Furthermore, since the network connection is maintained, in some implementations of content streaming, a processing unit (e.g., an independent processing unit (IPU), a centralized processing unit (CPU), a graphics processing unit (GPU), a neural processing unit (NPU), a co-processing unit (e.g., a co-processor), or another type of processing unit described elsewhere herein and/or a combination of multiple processing units) remains in an active state (also referred to as a "normal power," "high power," or "regular operating power" state herein).

Embodiments of the present disclosure provide network adapter-based techniques for reducing power consumption and/or compute resource expenditure for streaming in a front-end computing device. In an aspect, a computing device comprises a network adapter and a processing unit.

The network adapter receives content data over a network from a source device (e.g., of a cloud-based system). In implementations, the content data comprises a graphic data frame (e.g., an image, a frame of a video, a desktop display frame, and/or the like), text data, audio data, metadata, and/or any other data generated and/or otherwise provided by the source device to the computing device. The network data transmits a first graphic data frame to the processing unit. Subsequent to the processing unit entering a low-power state, the network adapter receives a second graphic data frame. Examples of low-power states include, but are not limited to, an idle state, a standby state, a sleep state, a display panel self refresh (PSR) mode, and/or any other operating state wherein local hardware and/or software of the computing device enters a state in which power consumed by the processing unit is lower than its normal/high power state. For instance, in accordance with an embodiment, an operating system of the computing device causes the processing unit to enter a deepest runtime idle platform state (DRIPS). The network adapter determines whether a level of similarity between the second graphic data frame and the first graphic data frame satisfies a threshold condition. If so, the network adapter prevents transmission of the second graphic data frame to the processing unit. Otherwise, the network adapter causes the processing unit to exit the low-power state and transmits the second graphic data frame to the processing unit. By selectively determining whether or not to transmit subsequent graphic data frames to the processing unit in this manner, embodiments of the present disclosure reduce the amount of time the processing unit is in a high/normal operating state, thereby reducing the amount of power consumed by the processing unit. Furthermore, in a mobile computing device implementation, such embodiments increase the battery life of the mobile computing device.

Systems, devices, and apparatuses may be configured in various ways for classifying assets. For example, FIG. 1 shows a block diagram of a system 100 for providing a network adapter-based smart streaming front-end for a computing device, in accordance with an example embodiment. As shown in FIG. 1, system 100 comprises a computing device 102 and a source device 104, which are communicatively coupled via a network 116. In examples, network 116 comprises one or more networks such as local area networks (LANs), wide area networks (WANs), enterprise networks, the Internet, etc. In examples, network 116 comprises one or more wired and/or wireless portions. The features of system 100 are described in detail as follows.

Source device 104 is a network-accessible computing device. Examples of source device 104 include, but are not limited to, a server or server set (e.g., of a cloud-based environment or platform), an application provider's computing device (e.g., a computer, a server, or another type of computing device configured to host an application), a computing device remotely located from computing device 102 that is sharing a desktop view with computing device 102. In a cloud-based system implementation, source device 104 comprises a node (e.g., a compute node configured to build, deploy, and/or manage resources of the cloud-based system (e.g., virtual machines, services, machine learning models, etc.), a storage node comprising a physical storage disk (or a plurality of physical storage disks) configured to store data, and/or any other type of node of a cloud computing environment). In an example of the cloud-based system implementation, source device 104 comprises one or more servers (e.g., a single server, a group of co-located servers (e.g., housed in one or more nearby buildings with associated components such as backup power supplies, redundant data communications, environmental controls, etc.) to form a datacenter, a group of servers distributed across multiple datacenters (e.g., datacenters located within a same region and/or datacenters located within different regions), and/or the like). In implementations, source device 104 is configured to host and/or otherwise manage content to be streamed to a computing device (e.g., computing device 102). For example, as shown in FIG. 1, source device 104 manages content 114. In implementations, content 114 is stored in memory of source device 104 and/or memory otherwise accessible to source device 104 (e.g., an external hard drive, a storage node of a separate device of a cloud computing system, and/or the like). In accordance with an embodiment, source device 104 executes an application (not shown in FIG. 1 for brevity) to access content 114, perform operations associated with content 114, and/or provide content 114 to computing device 102.

Computing device 102 is any type of stationary or mobile processing device, including, but not limited to, a desktop computer, a server, a mobile or handheld device (e.g., a tablet, a personal data assistant (PDA), a smart phone, a laptop, etc.), an Internet-of-Things (IoT) device, etc. In accordance with an embodiment, computing device 102 is associated with a user (e.g., an individual user, a group of users, an organization, a family user, a customer user, an employee user, a tenant, etc.). As shown in FIG. 1, computing device 102 comprises a network adapter 106, a processing unit 108, and a display 110, as well as other computing components not shown in FIG. 1 for illustrative clarity and brevity (e.g., timing controllers, device drivers (e.g., input device drivers, display drivers, etc.), other processing units (e.g., a co-processor), memory devices, physical ports, input devices, output devices, and/or the like). Network adapter 106 a hardware component configured to facilitate communication between computing device 102 and other devices (e.g., source device 104) over a network (e.g., network 116). An example of network adapter 106 includes, but is not limited to, a network interface controller, a network interface card (NIC), a LAN adapter, and a physical network interface. In accordance with an embodiment, network adapter 106 is physically separate from processing unit 108. For instance, in implementations, network adapter 106 is implemented on an expansion card that plugs into a computer bus of computing device 102, implemented as an integrated circuit chip of a motherboard of computing device 102 (e.g., that is physically separate from an integrated circuit chip of processing unit 108), implemented on a daughterboard communicatively coupled to the motherboard of computing device 102, implemented in a device plugged into a port of computing device 102 (e.g., a universal serial bus (USB) dongle connected to a USB port of computing device 102). As shown in FIG. 1, network adapter 106 is internal to computing device 102. In an alternative embodiment (e.g., in a USB dongle embodiment), network adapter 106 is external to and communicatively coupled to computing device 102.

Processing unit 108 is configured to perform tasks such as, but not limited to, program execution, signal coding, data processing, input/output processing, power control, and/or other functions. For instance, in embodiments, processing unit 108 performs a task to cause graphic content displayed by display 110 to be updated (e.g., based on user interaction with computing device 102, based on content received from network adapter 106, or based on another operation of processing unit 108), a task to establish a communication session with network adapter 106, a task to process input from an input device (not shown in FIG. 1), and/or any other type of task associated with the operation of computing device 102 and/or its components, as described elsewhere herein. In accordance with an embodiment, processing unit 108 is implemented as multiple processing units (e.g., a processor and a co-processor). An example embodiment of a computing device comprising multiple processing units is described with respect to FIG. 16.

Display 110 is any type of display device or component configured to display graphic content. In embodiments, display 110 is part of computing device 102 (e.g., a built-in touch screen, a built-in display screen, a display panel, etc.) or an external display coupled to computing device 102 (e.g., a monitor, a television, an external touch screen, etc.). Types of display 110 include, but are not limited to, liquid crystal displays (LCDs), light emitting diode (LED) displays (e.g., quantum dot LED (QLED) displays, organic LED (OLED) displays, etc.), plasma displays, etc. In accordance with an embodiment, display 110 comprises a driver and a timing controller. In accordance with an alternative embodiment, the display driver and/or timing controller for display 110 are separate components of computing device 102. Additional details regarding display drivers and timing controllers are described with respect to FIGS. 2 and 3, as well as elsewhere herein.

In embodiments, processing unit 108 operates in one of multiple operating states depending on tasks being performed, user interaction with computing device 102 (or an associated input device), and/or active communication sessions between processing unit 108 and other components of computing device 102. For instance, processing unit 108 operates in a "high" or "normal" operating state when actively performing tasks such as receiving data from network adapter 106, processing networking packets received from network adapter 106, transmitting data to be displayed on display 110, processing input signals received from an interface (or other component of computing device 102), determining presence of a user, detecting user interaction with computing device 102, and/or any other tasks described herein wherein processing unit 108 operates at a normal operating state. In implementations, there are periods of time where processing unit 108 enters a "low" operating state. During a low operating state, the amount of power consumed by processing unit 108 is reduced relative to the amount of power consumed by processing unit 108 operating in the high/normal operating state. In embodiments, processing unit 108 enters a low operating state when a user is not present, when user interaction causes processing unit 108 to enter a low power state (e.g., a user activates a sleep function of computing device 102), when graphic content displayed on display 110 does not change for a predetermined amount of time, and/or any other type of input or lack thereof that allows processing unit 108 to reduce power consumed.

To facilitate processing unit 108 operating in a low operating state, network adapter 106 comprises a frame comparator 112. Frame comparator 112 is implemented as hardware, software executable by hardware, firmware embedded into hardware, or a combination of software, hardware, and/or firmware. Frame comparator 112 compares graphic data frames received by network adapter 106 to determine if there is a change in graphic data between graphic data frames in a sequence of graphic data frames. For instance, suppose source device 104 is providing content 114 to computing device 102 over network 116 as a stream of data. In this context, content 114 comprises a sequence of graphic data frames. Network adapter 106 receives content 114 and provides a first graphic data frame to processing unit 108. Processing unit 108 processes the first graphic data frame and causes display 110 to display the first graphic data frame.

For subsequent frames, frame comparator 112 compares a current graphic data frame in the sequence (also referred to as an "incoming graphic data frame" herein) with the last graphic data frame provided to processing unit 108 (also referred to as the "previous graphic data frame" herein). If frame comparator 112 determines a level of similarity between the incoming graphic data frame and the previous graphic data frame satisfies a threshold condition (e.g., the graphic data of each frame matches), frame comparator 112 prevents the incoming graphic data frame from being transmitted to processing unit 108. By selectively preventing graphic data frames from being transmitted to processing unit 108 when there is no change in graphic data, network adapter 106 comprising frame comparator 112 allows processing unit 108 to enter a low power state, as processing unit 108 does not need to process graphic data that network adapter 106 receives from source device 104 if it is unchanged from the previously received graphic data. Furthermore, frame comparator 112 in accordance with an embodiment is optimized to compare graphic data frames. For instance, in accordance with an embodiment, network adapter 106 executes frame comparator 112 to perform (e.g., only) frame comparison operations. In this case, a portion of a chipset implementation of network adapter 106 is specialized to compare graphic data frames in a manner that reduces the time taken to compare graphic data frames and/or reduces the power consumed in comparing graphic data frames (e.g., relative to processing unit 108 comparing graphic data frames and/or continuously processing graphic data frames).

Figure 2:
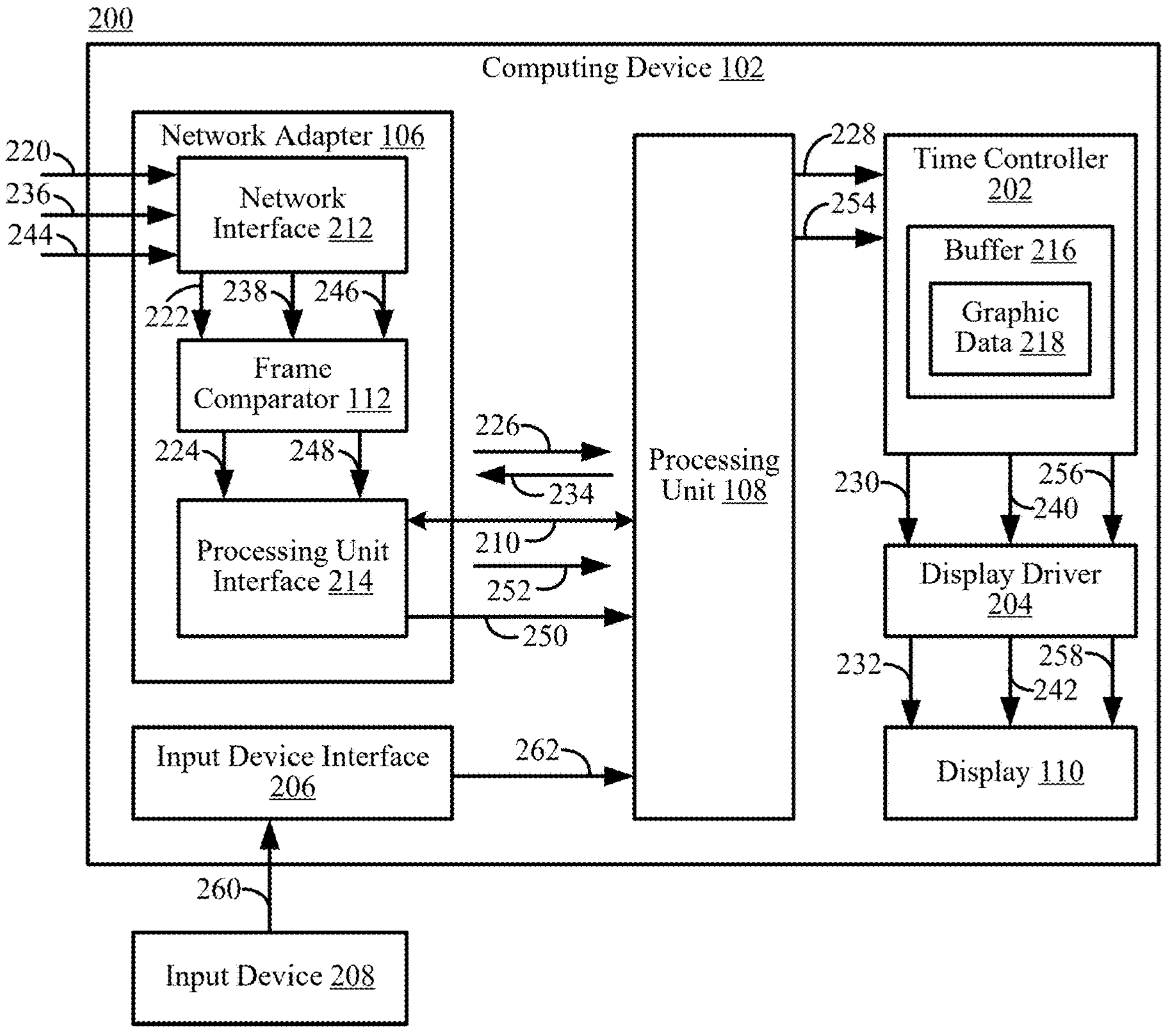
FIG. 2 shows a block diagram of a system comprising the network adapter of FIG. 1, in accordance with an example embodiment.

Embodiments of computing devices comprising a network adapter with frame comparison functions are configured in various ways. For instance, FIG. 2 shows a block diagram of a system 200 comprising network adapter 106 of FIG. 1, in accordance with an example embodiment. As shown in FIG. 2, system 200 comprises computing device 102 of FIG. 1 and an input device 208. Input device 208 is a device that enables a user to enter commands and/or information into computing device 102. Examples of input device 208 include, but are not limited to, a microphone, a camera, a keyboard, a pointing device, a joystick, a stylus, a touch pad, a tag device (e.g., a device that indicates a physical location or presence relative to computing device 102), and/or any other type of device that provides a signal corresponding to user input/interaction to computing device 102 (e.g., an input signal 232, as shown in FIG. 2). As shown in FIG. 2, input device 208 is external to computing device 102; however, embodiments described herein are not so limited. For instance, in an example, input device 208 is integrated into computing device 102 (e.g., a touchpad or keyboard of a laptop, a built-in microphone of a computer, and/or the like). In accordance with an embodiment, input device 208 and display 110 are integrated as a single device and/or component of computing device 102, for instance, as a touchscreen display.

As shown in FIG. 2, computing device 102 comprises network adapter 106 (comprising frame comparator 112), processing unit 108, and display 110, as respectively described with respect to FIG. 1, as well as a time controller 202, a display driver 204, and an input device interface 206. As also shown in FIG. 2, network adapter 106 comprises a network interface 212 and a processing unit interface 214. Network interface 212 operates to receive signals over a network (e.g., network 116) and provides the received signals to frame comparator 112. In embodiments, network interface 212 comprises a driver (e.g., a network driver, implemented in hardware, software, or a combination of hardware and software), a physical port (e.g., an ethernet port, a port for coupling to an external antenna, and/or the like), an antenna (e.g., a mobile network antenna (e.g., a 5G mobile network antenna), a Wi-Fi antenna, and/or the like), and/or any other hardware and/or software executable by hardware (e.g., by a co-processor of network adapter 106) to receive signals via a network and/or process the received signals.

Processing unit interface 214 operates to transmit signals to and receive signals from processing unit 108. For instance, in accordance with an embodiment, processing unit interface 214 provides data (e.g., as network data packets or as a signal generated from processed data packets) to processing unit 108 over a communication link 210. In embodiments, communication link 210 enables signals to be transmitted between network adapter 106 and processing unit 108. In embodiments, communication link 210 comprises one or more wireless and/or wired connections. In embodiments, processing unit interface 214 or processing unit 108 initializes establishment of and/or activation of communication link 210. In accordance with an embodiment, communication link 210 is established according to a standard protocol (e.g., a peripheral component interconnect express (PCIe) protocol). In embodiments, while communication link 210 is active, processing unit 108 expends resources (e.g., consumes power, spends processing time, and/or consumes other compute resources) to maintain and/or otherwise utilize communication link 210. In some embodiments, processing unit interface 214 transmits signals to processing unit 108 through other means (e.g., alternative to or in addition to communication link 210). For instance, in an example described further with respect to FIGS. 14 and 15, processing unit interface 214 (or a component thereof) transmits a signal through a coupling to a general purpose input/output pin of processing unit 108.

In accordance with an embodiment, processing unit interface 214 comprises a register (referred to as an "interrupt GPIO register" or an "interrupt register"). Processing unit interface 214 selectively toggles the register to an "active" or "inactive" state, as described elsewhere herein. If the register is in the inactive state, processing unit interface 214 does not cause processing unit 108 to exit a low power state (if processing unit is in the low power state). If the register is in the active, processing unit interface 214 causes processing unit 108 to exit the low power state (if it is in the low power state).

Network adapter 106 is shown in FIG. 2 as comprising network interface 212, frame comparator 112, and processing unit interface 214, as described above and elsewhere herein. In accordance with an embodiment, network interface 212, frame comparator 112, and/or processing unit interface 214 are implemented as hardware components of network adapter 106, software executed by network adapter 106, and/or a combination of hardware and software. For instance, in accordance with an embodiment, network adapter 106 comprises a processing unit (e.g., a "co-processing unit") not shown in FIG. 2, that executes program code stored in a memory device of network adapter 106 to perform operations of network interface 212, frame comparator 112, and/or processing unit interface 214, as described herein.

Time controller 202 ("TCON 202" herein) and displayer driver 204 operate to cause display 110 to display graphic content based on signals received from processing unit 108. In accordance with an embodiment, TCON 202 generates timing signals for driving display 110 via display driver 204. In accordance with an embodiment, display driver 204 comprises column and/or row drivers. In accordance with an embodiment display driver 204 is a hardware display driver, a software display driver executed by hardware, and/or a display driver implemented by a combination of software and hardware. In accordance with an embodiment, TCON 202 comprises a buffer that stores graphic data received from processing unit 108. In this context, TCON 202 is able to operate in a "Panel Self Refresh" (PSR) mode where TCON 202 refreshes display 110 utilizing the stored graphic data without having to receive new data from processing unit 108. By maintaining a buffer in this manner, processing unit 108 is able to enter a low powered mode without having to supply TCON 202 with new graphic data (i.e., in situations where there is no new graphic data (e.g., frame comparator 112 prevents transmission of a graphic data frame to processing unit 108)). Furthermore, in accordance with an embodiment, TCON 202, display deriver 204, and display 110 operate in a "low power display mode" during the PSR mode.

Input device interface 206 is configured to receive input signal 260 from input device 208 and provide a corresponding signal 262 to processing unit 108. In embodiments, input device interface 206 comprises device driver for input device 208, a physical port (e.g., a USB port, an HDMI port, and/or the like), and/or any other hardware and/or software utilized to receive signals and/or other data from input device 208. In accordance with an embodiment, input device interface 206 receives input signal 260 via a physical port or a wireless signal (e.g., a short-range wireless signal, an inductive wireless signal, a medium-range wireless signal, a long-range wireless signal). In accordance with an embodiment, input device interface 206 receives a wireless version of input signal 232 via network adapter 106. Alternatively, input device interface 206 receives a wireless version of input signal 260 via a separate network adapter or network interface (e.g., suppose network adapter 106 is a Wi-Fi network adapter and input device interface 206 comprises an adapter for near field communication (NFC).

In accordance with an embodiment, input device interface 206 causes processing unit 108 to exit a low power state based on input signal 260. For instance, in accordance with an embodiment, input signal 260 corresponds to movement of a pointing device (e.g., a mouse). In this example, input device interface 206 transmits signal 262 to processing unit 108 to cause processing unit 108 to exit a low power state (i.e., if processing unit is in the low power state). Alternatively, input device interface 206 transmits a signal to network adapter 106 to cause processing unit interface 214 to toggle an interrupt register to "active".

In a further embodiment, input device interface 206 delays wakeup of processing unit 108 based on an analysis of input signal 260. For instance, suppose input device 208 is a tag device that indicates a relative distance between input device 208 and computing device 102. In this example, input device interface 206 determines if the location of input device 208 satisfies a wakeup condition (e.g., input device 208 is within a predetermined distance of computing device 102). If so, input device interface 206 causes processing unit 108 to exit a low power state (if it is in the low power state). Otherwise, input device interface 206 delays wakeup (with respect to the tag device) until the location of the tag device satisfies the wakeup condition. In an alternative aspect, input device interface 206 determines a velocity at which input device 208 is approaching computing device 102 or an approximate amount of time before input device 208 will arrive within a threshold distance of computing device 102. In this context, input device interface 206 delays causing wake-up of processing unit 108 (in situations where processing unit 108 is in a low power state) based on the expected arrival time of input device 208. For instance, in accordance with an embodiment, input device interface 206 delays causing wake-up of processing unit 108 until an amount of time before the expected arrival time of input device 208 that it takes processing unit 108 to exit the low power state and enter the high/regular power state. By delaying wake up of processing unit 108 in this manner, such embodiments of input device interface 206 further conserve power consumed by processing unit 108. Furthermore, by pre-emptively waking up processing unit 108, such embodiments of input device interface 206 improve the user experience with respect to computing device 102 by ensuring computing device 102 is prepared for interaction by the user upon their arrival.

Figure 3A:
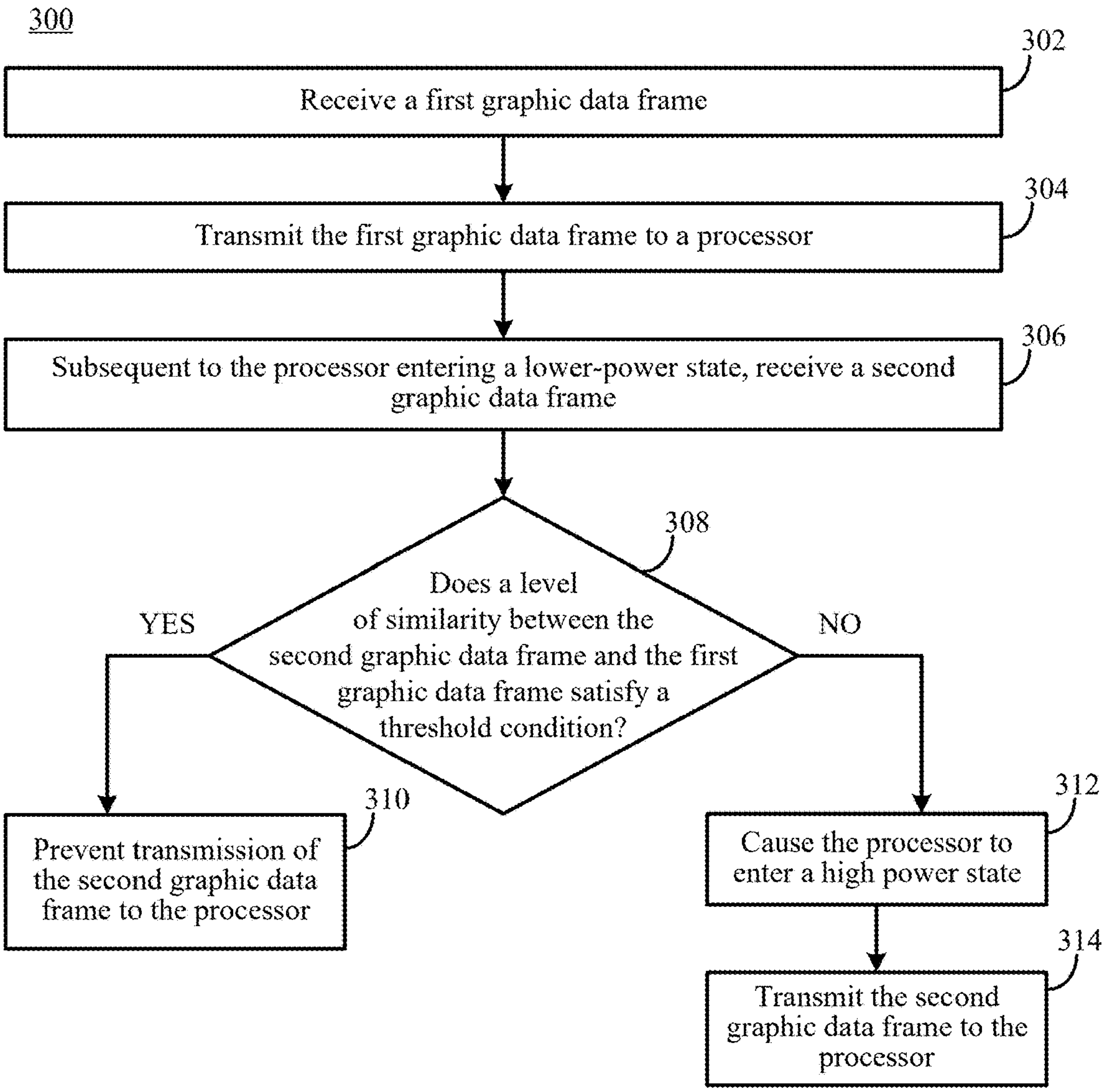
FIG. 3A shows a flowchart of a process for determining whether or not to transmit graphic data to a processor, in accordance with an example embodiment.

In order to better understand the operation of frame comparator 112 of FIG. 2, FIG. 2 is described with respect to FIG. 3A. FIG. 3A shows a flowchart 300 of a process for determining whether or not to transmit graphic data to a processor, in accordance with an example embodiment. In an embodiment, network adapter 106 operates according to the steps of flowchart 300. Note not all steps of flowchart 300 need be performed in all embodiments. Further structural and operational embodiments will be apparent to persons skilled in the relevant art(s) based on the following descriptions of FIGS. 2 and 3A.

Flowchart 300 begins with step 302. In step 302, a first graphic data frame is received. For example, network interface 212 of FIG. 2 receives network signal 220 (e.g., over network 116) comprising a graphic data frame 222. In accordance with an embodiment, graphic data frame 222 represents a frame of graphics data of content 114 (e.g., a video frame, an image, a frame of a remote desktop, etc.). Depending on the implementation, network interface 212 receives a single graphic data frame or multiple graphic data frames at a time. As shown in FIG. 2, network interface 212 provides graphic data frame 222 to frame comparator 112 and flowchart 300 continues to step 304.

In step 304, the first graphic data frame is transmitted to a processor. For example, frame comparator 112 of FIG. 2 provides a comparison signal 224 to processing unit interface 214 to cause processing unit interface 214 to transmit a graphic update signal 226 over communication link 210 to processing unit 108. Graphic update signal 226 comprises graphic data frame 222. Depending on the implementation, frame comparator 112 determines a level of similarity between graphic data frame 222 and a previously received graphic data frame prior to causing it to be transmitted to processing unit 108. Alternatively, graphic data frame 222 is a first graphic data frame received for graphic data provided to network adapter 106.

Transmission of graphic data frame 222 (via graphic update signal 226) causes processing unit 108 to enter a regular/high power state (e.g., if it is not already in this state) and process graphic data frame 222 into processed graphic data 228. Processing unit 108 transmits processed graphic data 228 to time controller 202. Time controller 202 stores processed graphic data 228 as graphic data 218 in buffer 216 and provides a control signal 230 to display driver 204. Responsive to control signal 230, display driver 204 drives display 110 via drive signal 232 to cause display 110 to display graphics based on processed graphic data 228.

In some embodiments, network adapter 106 stores a graphic data frame, or data representative of a graphic data frame, in memory (e.g., a buffer), not shown in FIG. 2 for illustrative brevity. For instance, suppose, in accordance with an embodiment, network adapter 106 stores graphic data frame 222 or data representative of graphic data frame 222 in a buffer. In accordance with an embodiment, network adapter 106 stores a single previously transmitted graphic data frame. Alternatively, network adapter 106 stores a predetermined number of (or a predetermined size of) previously transmitted graphic data frames. In this manner, network adapter 106 is able to access previously received graphic data frames to perform various functions described herein (e.g., to compare a received graphic data frame to a previously transmitted graphic data frame).

In step 306, subsequent to the processor entering a lower-power state, a second graphic data frame is received. For example, suppose processing unit 108 of FIG. 2 enters a low-power state (e.g., subsequent to having provided processed graphic data 228 to TCON 202). In this context, further suppose network interface 212 receives a network signal 236 (e.g., over network 116) and provides a graphic data frame 238 within network signal 236 to frame comparator 112. In some embodiments, and as further described with respect to FIG. 3B, processing unit 108 provides a sleep indication 234 to network adapter 106, wherein sleep indication 234 indicates processing unit 108 is entering, or has already entered, a low power state. In accordance with an embodiment, processing unit 108 entering a low-power state causes communication link 210 to deactivate, which reduces power consumed by processing unit 108 and processing unit interface 214 in maintaining an active link.

In step 308, a determination of whether a level of similarity between the second graphic data frame and the first graphic data frame satisfies a threshold condition is made. For example, frame comparator 112 determines whether a level of similarity between graphic data frame 238 and graphic data frame 220 satisfies a threshold condition. Depending on the implementation, frame comparator 112 determines the level of similarity based on a comparison of pixels of the graphic data frames (e.g., as further described with respect to FIG. 4, as well as elsewhere herein), utilizing a hash technique (e.g., as further described with respect to FIGS. 5, 6, and 13, as well as elsewhere herein), utilizing a machine learning (ML) model (e.g., as described with respect to FIGS. 7-9, as well as elsewhere herein). In some embodiments, and as described with respect to FIGS. 10-13 (as well as elsewhere herein), frame comparator 112 determines a level of similarity between respective portions of graphic data frames. In embodiments, the threshold condition specifies that there is no difference between the graphic data frames, specifies a level of confidence that there is no difference between the graphic data frames that frame comparator 112 is to have, and/or specifies a threshold the level of similarity (e.g., other than 100% similarity) is to meet or exceed. As an example, in accordance with an embodiment, the level of similarity is allowed to be below an exact match to account for errors in comparison of frames, graphic artifacts caused by network stability between computing device 102 and source device 104, and/or the like. If the level of similarity satisfies the threshold condition, flowchart 300 continues to step 310. Otherwise, flowchart 300 proceeds to step 312. For instance, with respect to the example shown in FIG. 2, suppose frame comparator 112 determines the level of similarity between graphic data frame 220 and graphic data frame 238 satisfies a threshold condition and flowchart 300 proceeds to step 310.

In step 310, transmission of the second graphic data frame to the processor is prevented. For example, frame comparator 112 of FIG. 2 prevents transmission of graphic data frame 238 to processing unit 108 (i.e., since the level of similarity between graphic data frame 238 and graphic data frame 220 satisfies a threshold condition, as determined in step 308). By preventing transmission to the processing unit 108 if the graphic data has not changed, frame comparator 112 allows processing unit 108 to remain in a low-power state, which reduces power consumption. In accordance with an embodiment, processing unit interface 214 maintains an interrupt register in an "inactive" state for graphics refresh, as graphic information does not need to be updated or processed by processing unit 108.

Furthermore, processing unit 108 is not required to resend data to TCON 202. In this context, TCON 202 initiates a PSR state, where the previous graphic data (stored as graphic data 218) is provided from buffer 216, thereby allowing processing unit 108 to operate in the low-powered state and enabling the display system (e.g., TCON 202, display driver 204, and display 110) to operate in a low power display mode. For example, as shown in FIG. 2, time controller 202 provides a control signal 240 to display driver 204. Responsive to control signal 240, display driver 204 drives display 110 via drive signal 242 to cause display 110 to display graphics based on stored graphics data 218.

As described elsewhere herein, network adapter 106 stores the previously transmitted graphic data frame (e.g., graphic data frame 222) in memory. Depending on the implementation, network adapter 106 updates the stored graphic data frame to be the most recently received graphic data frame, regardless of whether or not the graphic data frame was transmitted to processing unit 108. For instance, in accordance with an embodiment, network adapter 106 updates stored data in memory to include graphic data frame 238 (or data representative thereof) (e.g. and removes graphic data frame 222 (or data representative thereof) from the memory, thereby clearing storage space). In an alternative embodiment, network adapter 106 (e.g., only) updates the stored graphic data frame if the level of similarity fails to satisfy the threshold condition. For instance, in the example shown in FIG. 2, network adapter 106 would not update the stored data with graphic data frame 238, since the level of similarity between graphic data frames 222 and 238 satisfies the threshold condition. By selectively updating stored graphic data frames in this manner, the amount of compute resources expended by network adapter 106 per graphic data frame is reduced.

In step 312, the processor is caused to enter a high power state. For instance, with respect to FIG. 2, suppose network interface 212 receives network signal 244 comprising graphic data frame 246 and provides graphic data frame 246 to frame comparator 112. Further suppose frame comparator 112 determines a level of similarity between graphic data frame 246 and either graphic data frame 222 or graphic data frame 238 fails to satisfy the threshold condition. In this context, frame comparator 112 transmits a comparison signal 248 to processing unit interface 214, which causes processing unit interface 214 to "wakeup" processing unit 108 (i.e., causes processing unit 108 to enter a high/normal power state). In this context, a "high power state" is a power state where processing unit 108 consumes more power, or has capacity to consume more power, than in the low power state. In this context, the high power state is a power state in which processing unit 108 is able to process graphic data frames in an effective and/or timely manner. Furthermore, suppose the low power state is a power state in which processing unit 108 is completely unable to process graphic data frames (e.g., a low power state that minimizes (or nearly minimizes) function of processing unit 108 such that power savings are maximized, or nearly maximized). In accordance with an embodiment, and as shown in FIG. 2, processing unit interface 214 causes processing unit 108 to enter the high power state by transmitting a wakeup signal 250. Depending on the implementation, wakeup signal 250 is a voltage potential applied to a pin of processing unit 108 (e.g., as described with respect to FIGS. 14 and 15, as well as elsewhere herein), a current amplitude applied to a pin of processing unit 108, a communication signal configured according to a communication protocol (e.g., a "wakeup" signal according to a PCIe protocol), and/or any other type of signal that, when received by or applied to processing unit 108, causes processing unit 108 to exit a low power state. In accordance with an embodiment, a communication link is established between network adapter 106 and processing unit 108 (e.g., either by establishing a new communication link or by reactivating an inactive communication link). For instance, as a non-limiting example, suppose communication link 210 is reactivated subsequent to processing unit 108 entering the high power state.

In step 314, the second graphic data frame is transmitted to the processor. For instance, processing unit interface 214 of FIG. 2 transmits a graphic update signal 252 to processing unit 108 (e.g., over communication link 210). Graphic update signal 252 comprises graphic data frame 246. While graphic update signal 252 and wakeup signal 250 are shown as separate signals in FIG. 2, in an alternative embodiment graphic update signal 252 and wakeup signal 250 are the same signal. In this context, transmission of graphic data frame 246 to processing unit 108 causes processing unit 108 to exit the low power state and enters a high power state.

Transmission of graphic data frame 246 (via graphic update signal 252) causes processing unit 108 to process graphic data frame 246 into processed graphic data 254. Processing unit 108 transmits processed graphic data 254 to TCON 202. TCON 202 stores processed graphic data 254 as graphic data 218 in buffer 216 (e.g., overwriting previously stored processed graphic data 228) and provides a control signal 256 to display driver 204. Responsive to control signal 256, display driver 204 drives display 110 via drive signal 258 to cause display 110 to display graphics based on processed graphic data 254.

In examples described with respect to FIGS. 2 and 3, graphic data frames 222, 238, and 246 are received in separate network signals 220, 236, and 244, respectively. In accordance with an embodiment, network signals 220, 236, and 244 are sequential network data packets in a stream of data packets received over a network. Alternatively, network signals 220, 236, and 244 are separate signals. In accordance with another embodiment, graphic data frames 222, 238, and 246 are received simultaneously (e.g., as a batch of graphic data frames) in a single signal. In accordance with an embodiment, network interface 212 queues graphic data frames in a queue (not shown in FIG. 2) for further processing by frame comparator 112. By utilizing a queue (which is implemented as a buffer or set of buffers, in an embodiment), network interface 212 enables graphic data frames to be received over network 116 and prepared for processing in parallel to frame comparator 112 comparing other graphic data frames.

Figure 3B:
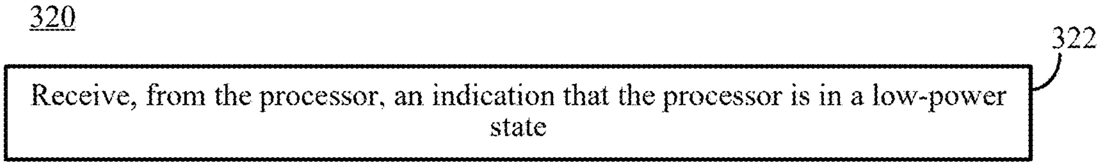
FIG. 3B shows a flowchart of a process for determining a state of a processor, in accordance with an example embodiment.

In implementations, network adapter 106 operates to determine processing unit 108 is in a low-power state in various ways. For example, FIG. 3B shows a flowchart 320 of a process for determining a state of a processor, in accordance with an example embodiment. In an embodiment, network adapter 106 operates according to the steps of flowchart 320. Note flowchart 320 need not be performed in all embodiments. Further structural and operational embodiments will be apparent to persons skilled in the relevant art(s) based on the following description of FIG. 3B in view of FIG. 2.

Flowchart 320 comprises step 322. In step 322, an indication that the processor is in a low-power state is received from the processor. For example, processing unit interface 214 of FIG. 2 receives sleep indication 234 from processing unit 108. In this context, sleep indication 234 indicates processing unit 108 is in a low-power state. In an implementation, processing unit 108 actively provides sleep indication 234 to processing unit interface 214 (e.g., as part of the process of entering the low-power state). In this context, processing unit interface 214 is not required to actively determine and/or otherwise monitor if processing unit 108 is active (e.g., in a high power or normal power state), which conserves compute resources expended by processing unit interface 214. Alternatively, processing unit interface 214 determines processing unit 108 is in a low power state based on a "passive" indication. Examples of passive indications include, but are not limited to, not receiving a "heartbeat" pulse from processing unit 108 within a predetermined time, determining a value of a register of processing unit 108 has changed from indicating processing unit 108 is active to indicating processing unit 108 is inactive, and/or the like. In this context, processing unit interface 214 is able to detect if processing unit 108 enters a low power state without processing unit 108 having to provide or otherwise generate an external indication, thereby reducing power consumed by processing unit 108 and reducing the time taken for processing unit 108 to enter a low-power state.

Figure 4:
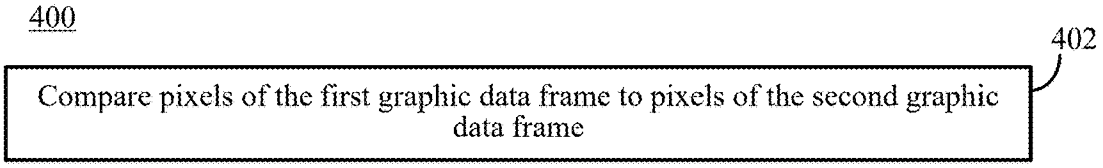
FIG. 4 shows a flowchart of a process for determining a level of similarity between graphic data frames based on pixel comparison, in accordance with an example embodiment.

Embodiments of frame comparator 112 determine a level of similarity between graphic data frames in various ways, in embodiments. For instance, FIG. 4 shows a flowchart 400 of a process for determining a level of similarity between graphic data frames based on pixel comparison, in accordance with an example embodiment. In an embodiment, frame comparator 112 operates according to the steps of flowchart 400. Note not all steps of flowchart 400 need be performed in all embodiments. Further structural and operational embodiments will be apparent to persons skilled in the relevant art(s) based on the following description of FIG. 4 with respect to FIG. 2.

Flowchart 400 comprises step 402. In step 402, pixels of the first graphic data frame are compared to pixels of the second graphic data frame. For example, frame comparator 112 of FIG. 2 compares pixels of graphic data frames 222 and 238 to determine a level of similarity between the frames. In accordance with an embodiment, frame comparator 112 compares each pixel of graphic data frame 222 to a corresponding pixel located in the same area (or an otherwise corresponding area) of graphic data frame 238. In an alternative embodiment, frame comparator 112 compares groups of pixels of graphic data frame 222 to corresponding groups of pixels of graphic data frame 238. In either case, frame comparator 112 determines if graphic data frame 222 (or a portion thereof) is identical to or different from graphic data frame 238 (or a corresponding portion thereof). In an embodiment, if the graphic data frames are identical, graphic data frame 238 (also referred to as the incoming graphic data frame) is discarded.

In accordance with an embodiment, if there is a difference between pixels of the two data frames, frame comparator 112 causes processing unit interface 214 to transmit graphic data frame 238 to processing unit 108, e.g., in a manner as described with respect to step 314 of flowchart 300 of FIG. 3A. In an alternative aspect, frame comparator 112 causes only a portion of the incoming graphic data frame to be transmitted to processing unit 108. For instance, in some implementations, frame comparator 112 causes (e.g., only) updated pixels or portions of the incoming graphic data frame that comprise updated pixels to be transmitted to processing unit 108. By only transmitting a portion of the incoming data frame to processing unit 108, the amount of time in which processing unit 108 has to re-enter a high power state in order to process the transmitted portion is reduced compared to having to process an entire graphic data frame, thereby reducing compute resources (e.g., power) expended in processing updated graphic data frames. In particular, pixel-by-pixel comparison enables granular transmission of updated graphic data (e.g., sub-regions of a graphic data frame or individual pixel updates). Additional details regarding transmitting portions of graphic data frames are described with respect to FIGS. 10-13, as well as elsewhere herein.

Figure 5:
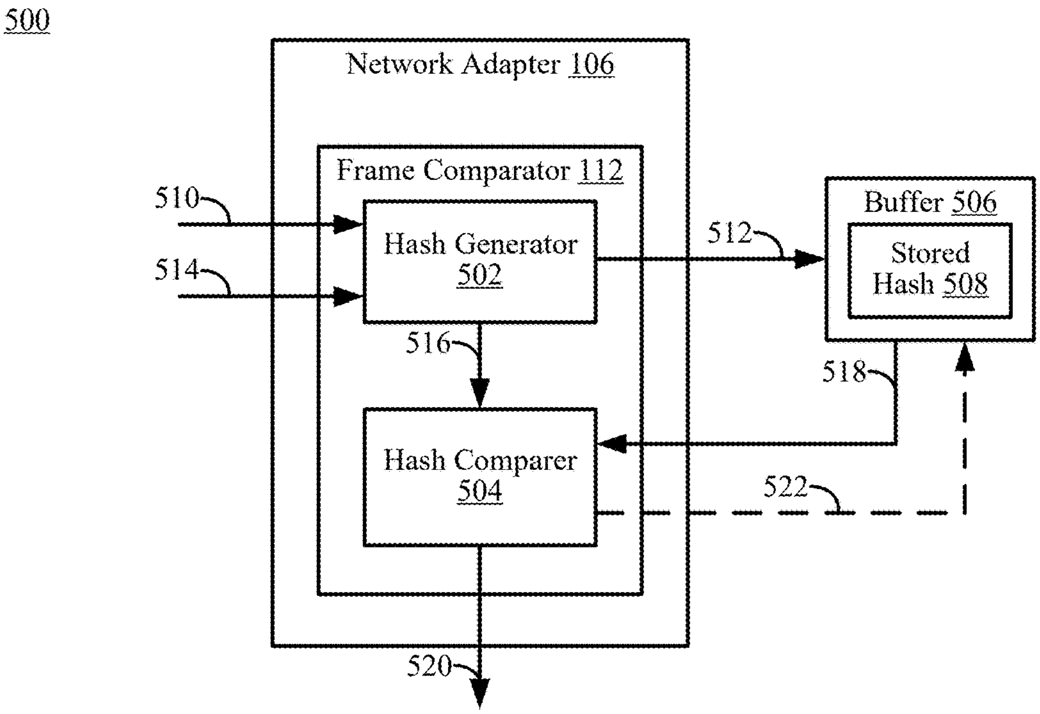
FIG. 5 shows a block diagram of a system for determining a level of similarity between graphic data frames utilizing a hash technique, in accordance with an example embodiment.

As described herein, frame comparator 112 determines a level of similarity between graphic data frames in various ways, in embodiments. For instance, in accordance with an embodiment, frame comparator 112 determines a level of similarity utilizing a hashing technique. Some implementations of frame comparator 112 are configured in various ways to utilize a hash technique to determine a level of similarity. For instance, FIG. 5 shows a block diagram of a system 500 for determining a level of similarity between graphic data frames utilizing a hash technique, in accordance with an example embodiment. System 500 comprises network adapter 106 (comprising frame comparator 112) and a buffer 506. Buffer 506 is a region of memory utilized to temporarily store data. For instance, buffer 506 stores a hash 508. In accordance with an embodiment, and as shown in FIG. 5, buffer 506 is located in memory external to (but communicatively coupled to) network adapter 106. In an alternative embodiment, buffer 506 is located in memory internal to network adapter 106. As also shown in FIG. 2, frame comparator 112 comprises a hash generator 502 and a hash comparer 504, each of which are implemented as sub-services and/or sub-components of frame comparator 112.

Figure 6:
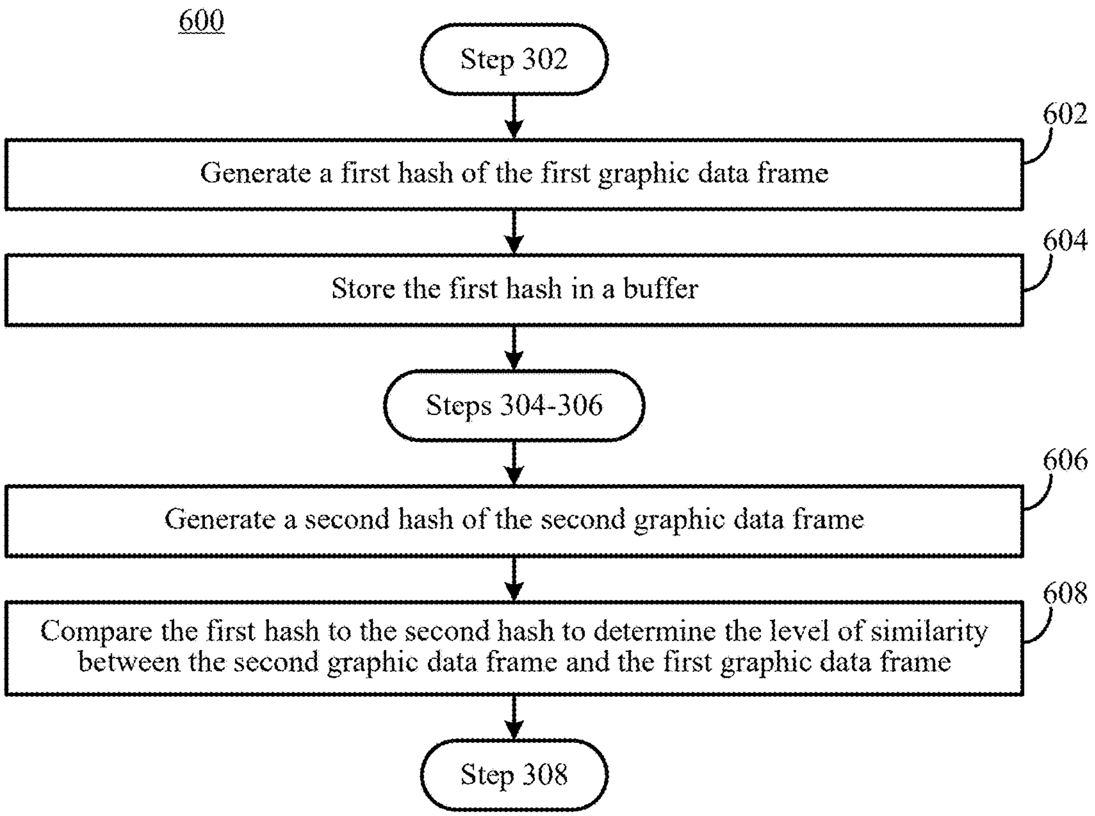
FIG. 6 shows a flowchart of a process for determining a level of similarity between graphic data frames utilizing a hash technique, in accordance with an example embodiment.

To better illustrate the operation of frame comparator 112 of FIG. 5, FIG. 5 is described with respect to FIG. 6. FIG. 6 shows a flowchart 600 of a process for determining a level of similarity between graphic data frames utilizing a hash technique, in accordance with an example embodiment. In an embodiment, network adapter 106 of FIG. 5 operates according to the steps of flowchart 600. Note not all steps of flowchart 600 need be performed in all embodiments. Further structural and operational embodiments will be apparent to persons skilled in the relevant art(s) based on the following descriptions of FIGS. 5 and 6.

Flowchart 600 begins with step 302 of flowchart 300 of FIG. 3A. For instance, hash generator 502 of FIG. 5 receives a first graphic data frame 510 in a similar manner to those described with respect to step 302 of flowchart 300, as well as elsewhere herein.

Flowchart 600 proceeds to step 602. In step 602, a first hash of the first graphic data frame is generated. For example, hash generator 502 of FIG. 5 generates a first hash 512 of graphic data frame 510 (also referred to as a "hash value 512"). In accordance with an embodiment, hash generator 502 generates hash 512 by converting graphic data frame 510 to a fixed-length value. Alternatively, hash values generated by hash generator 502 have a variable length. In accordance with an embodiment, hash generator 502 utilizes a geometric hashing or grid hashing method to generate hash 512.

In step 604, the first hash is stored in a buffer. For example, hash generator 502 of FIG. 5 stores hash 512 in buffer 506 as "stored hash 508". In this example, suppose hash 512 is the first hash generated by hash generator 502 for a streaming session. In this case, flowchart 600 continues to step 304 of FIG. 3A. Alternatively, if hash 512 is a hash of a graphic data frame received subsequent to another, hash 512 is compared to a hash of a previously transmitted graphic data frame, in a manner similar to that further described in step 608.

Flowchart 600 continues in a similar manner to steps 304 and 306 of flowchart 300 of FIG. 3A. For instance, network adapter 112 transmits the first graphic data frame to processing unit 108 of FIG. 1. This causes processing unit 108 to process the first graphic data frame and update display 110 to show graphic data of the first graphic data frame. Subsequent to causing display 110 to update, processing unit 108 enters a low-power state. Subsequent to processing unit 108 entering a low-power state, frame comparator 112 of FIG. 5 receives graphic data frame 514 (e.g., in a similar manner to those described with respect to step 306 of flowchart 300, as well as elsewhere herein).

Flowchart 600 proceeds to step 606. In step 606, a second hash of the second graphic data frame is generated. For example, hash generator 502 generates a hash 516 of graphic data frame 514. Hash 516 is generated in a similar manner as the techniques described with respect to step 602. In accordance with an embodiment, hash 516 is the same length as hash 512.

In step 608, the first hash is compared to the second hash to determine the level of similarity between the second graphic data frame and the first graphic data frame. For example, hash comparer 504 compares hash 516 and stored hash 508 (i.e., hash 512) to determine a level of similarity between graphic data frames 514 and 510. As shown in FIG. 5, hash comparer 504 receives stored hash 508 via stored hash signal 518.

Flowchart 600 continues to step 308, where a determination of whether or not the level of similarity satisfies a threshold condition is made. For instance, if the level of similarity satisfies the threshold condition, transmission of graphic data frame 514 is prevented. In this case, hash 516 is discarded. If the level of similarity fails to satisfy the threshold, frame comparator 112 causes graphic data frame 514 (or a portion thereof) to be transmitted to processing unit 108. For instance, as shown in FIG. 5, hash comparer 504 generates a comparison signal 520. In an embodiment, comparison signal 520 is provided to processing unit interface 214 and causes processing unit interface 214 to transmit graphic data frame 514 to processing unit 108 (e.g., in a manner similar to that described with respect to step 314 of flowchart 300, as well as elsewhere herein). In this context, hash comparer 504 updates stored hash 508 with the value of hash 516 via a hash storage signal 522 (e.g., overwriting or discarding the previously stored hash value).

Thus, an example of utilizing a hash technique to determine a level of similarity between graphic data frames has been described with respect to FIGS. 5 and 6. By utilizing a hash technique, network adapter 106 (or memory communicatively coupled to network adapter 106, e.g., buffer 506) (e.g., only) has to store a hash of a previous graphic data frame. This reduces the storage space required to store data representative of a previous graphic data frame (e.g., a hash)

for use by network adapter 106 in determining levels of similarity between incoming and previous frames. By reducing the storage space, the size of the memory device of network adapter 106 can be reduced, which reduces operating and manufacturing costs. Furthermore, reducing the amount of storage space consumed by storing data representative of a previous graphic data frame, the compute resources (e.g., power consumption) expended to store the data are reduced.

Figure 7:
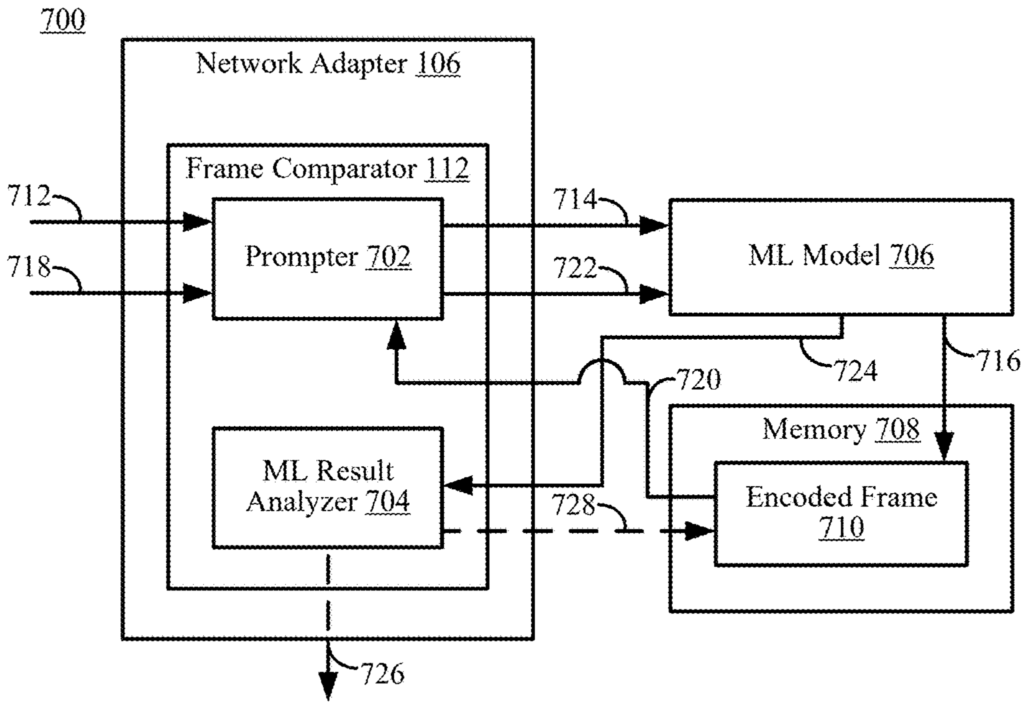
FIG. 7 shows a block diagram of a system for determining a level of similarity between graphic data frames utilizing a machine learning model, in accordance with an example embodiment.

As described herein, embodiments of frame comparator 112 determine a level of similarity between graphic data frames in various ways. For instance, in some implementations, frame comparator 112 is configured to leverage a machine learning (ML) model to determine a level of similarity between graphic data frames. For example, FIG. 7 shows a block diagram of a system 700 for determining a level of similarity between graphic data frames utilizing a machine learning model, in accordance with an example embodiment. As shown in FIG. 7, system 700 comprises network adapter 106 (comprising frame comparator 112) of FIG. 1, as well as an ML model 706 and a memory 708. As also shown in FIG. 7, frame comparator 112 comprises a prompter 702 and an ML result analyzer 704, each of which are implemented as sub-services and/or sub-components of frame comparator 112. Prompter 702 is configured to generate a prompt to be provided to ML model 706. ML result analyzer 704 is configured to analyze output of ML model 706.

ML model 706 is any type of model that is trained to find patterns and/or make decisions with respect to provided data. As shown in FIG. 7, ML model 706 is separate from network adapter 106; however, in an alternative embodiment, network adapter 106 (or a component thereof) stores and/or executes ML model 706. In accordance with an embodiment, ML model 706 is hosted on a server communicatively coupled to network adapter 106 over a network. In accordance with an alternative embodiment, ML model 706 is implemented utilizing a neural processing unit (NPU) of network adapter 106 and/or computing device 102. In this context, ML model 706 is stored in memory accessible to (e.g., physically within or communicatively coupled to) the NPU. By implementing ML model 706 utilizing an NPU of computing device 102 (or a component thereof), embodiments of system 700 are able to reduce the time spent communicating with and utilizing ML model 706, as communicating over a wireless network takes time. Furthermore, utilizing ML model 706 (which is trained to generate embeddings) enables determinations of levels of similarities to leverage knowledge across a (e.g., vast) set of training data. For instance, in a large language model (LLM) generative artificial intelligence (AI) implementation, ML model 706 is trained to generate embeddings based on a corpus of information (e.g., publicly available information on the Internet, and/or the like). Thus, utilization of ML model 706 is able to identify detailed/accurate embeddings for a wide variety of data.

In accordance with an embodiment, ML model 706 is an embedding model configured to generate embeddings that are information dense representations of semantic meaning of input (e.g., a graphic data frame). For instance, in accordance with an embodiment, an embedding is a vector of floating-point numbers such that the distance between two embeddings in vector space is correlated with semantic similarity between two inputs in their original format (e.g., an image format). As an example, if two images (e.g., two graphic data frames) are similar, their vector representations should also be similar. In this manner, embeddings generated by embedding model 128 provide representation of data usable by systems described herein for performing various functions associated with data represented by embeddings. For instance, ML model 706 is configured to determine a level of similarity between graphic data frames based on the embeddings and provide the level of similarity to ML result analyzer 704 for analysis thereof. In an alternative embodiment, ML model 706 provides embeddings to ML result analyzer 704 for analysis thereof. In accordance with another embodiment, ML model 706 stores embeddings of a graphic data frame as an encoded frame 710 in memory 708.

In accordance with an embodiment, ML model 706 is trained utilizing an ML model trainer (not shown in FIG. 7). Depending on the implementation, the ML model trainer is an application executable by network adapter 106, an application executable by computing device 102, or an application executable by a server hosting ML model 706. In accordance with another embodiment, computing device 102 receives ML model 706 as a pre-trained model (e.g., a model trained by a model provider computing device that executes an ML model trainer to train ML model 706). In accordance with an embodiment, the ML model trainer trains ML model 706 to determine a level of similarity between graphic data frames. Alternatively (or additionally), the ML model trainer trains ML model 706 to generate embeddings for a received graphic data frame. In embodiments, the ML model trainer utilizes supervised learning, unsupervised learning, reinforcement learning, and/or a combination thereof to train ML model 706. In accordance with an embodiment, ML model 706 is trained on a large dataset of graphic data (e.g., on graphic data obtained from the Internet, on large sets of graphic data, and/or the like). By utilizing an ML model trained on a variety of data, implementations of frame comparator 112 that utilize ML model 706 are able to determine levels of similarity between a large variety (e.g., any) of graphic data frames. In an alternative embodiment, ML model 706 is trained based on a specific type of graphic data. For instance, in an example embodiment, ML model 706 is trained based on graphic data corresponding to remote desktops. In another example, ML model 706 is trained based on graphic data corresponding to content a particular service provider provides. By utilizing an ML model trained on a specific type or subset of graphic data, the output of the ML model is specialized for that type of data (and is therefore more accurate and less likely to cause hallucinations). Furthermore, an ML model trained for a specific type or subset of graphic data is smaller in size (and therefore utilizes less storage space).

Memory 708 is any type of memory device configured to store data. For instance, in accordance with an embodiment, and as shown in FIG. 7, memory 708 is a memory device external to network adapter 106 configured to store encoded frame 710. In accordance with an alternative embodiment, memory 708 is incorporated into network adapter 106. In accordance with an embodiment, memory 708 stores ML model 706.

Figure 8:
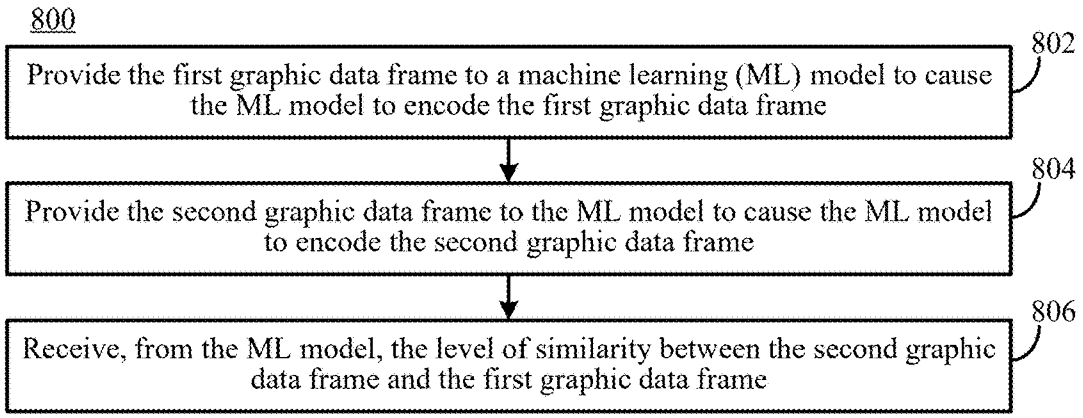
FIG. 8 shows a flowchart of a process for determining a level of similarity between graphic data frames utilizing a machine learning model, in accordance with an example embodiment.

In some embodiments, frame comparator 112 utilizes ML model 706 to determine a level of similarity between graphic data frames. To better understand this operation of system 700, FIG. 7 is described with respect to FIG. 8. FIG. 8 shows a flowchart 800 of a process for determining a level of similarity between graphic data frames utilizing a machine learning model, in accordance with an example embodiment. In an embodiment, network adapter 106 of FIG. 7 operates according to the steps of flowchart 800. Note not all steps of flowchart 800 need be performed in all embodiments. Further structural and operational embodiments will be apparent to persons skilled in the relevant art(s) based on the following description of FIG. 8 with respect to FIG. 7.

Flowchart 800 begins with step 802. In step 802, the first graphic data frame is provided to an ML model to cause the ML model to encode the first graphic data frame. For example, prompter 702 of FIG. 7 receives graphic data frame 712 and provides a prompt 714 (comprising graphic data frame 712) to ML model 706 to cause ML model 706 to encode graphic data frame 712. In accordance with an embodiment, ML model 706 encodes graphic data frame 712 as embeddings that semantically represent graphic data frame 712. By encoding previous graphic data frames, the amount of storage space utilized to store data representative of graphic data frame 712 is reduced. In this context, the storage size of the determined embeddings is smaller than graphic data frame 712, which conserves storage space and memory device size required to store embeddings. As shown in FIG. 7, ML model 706 stores the encoded version of graphic data frame 712 as encoded frame 710 in memory 708 via storage signal 716.

In step 804, the second graphic data frame is provided to the ML model to cause the ML model to encode the second graphic data frame. For example, prompter 702 of FIG. 7 receives a graphic data frame 718 and provides a prompt 722 (comprising graphic data frame 718) to ML model 706 to cause ML model 706 to encode graphic data frame 718. In some embodiments, and as shown in FIG. 7, prompter 702 accesses a previously encoded frame (e.g., encoded frame 710) via signal 720. In this context, prompter 702 includes the previously encoded frame in prompt 722 to cause ML model 706 to determine a level of similarity between graphic data frame 718 and the previously encoded frame (i.e., representative of graphic data frame 712). In an alternative aspect, ML model 706 accesses the previously encoded frame responsive to receiving prompt 722. For instance, in an alternative embodiment, prompt 722 comprises instructions to determine a level of similarity between the included graphic data frame 718 and the currently stored encoded frame (e.g., encoded frame 710).

In step 806, the level of similarity between the second graphic data frame and the first graphic data frame is received from the ML model. For example, ML result analyzer 704 of FIG. 7 receives ML output 724 from ML model 706. In this example, ML output 724 is indicative of a level of similarity between graphic data frames 712 and 718. In accordance with an embodiment, ML model 706 determines the level of similarity by encoding graphic data frame 718 and comparing the encoded version of graphic data frame 718 to encoded frame 710. For instance, in an aspect where encoded frames are embeddings that semantically represent corresponding graphic data frames, ML model 706 determines a level of semantic similarity between graphic data frames 712 and 718 based on respective embeddings. By having the ML model determine the level of similarity, the amount of compute resources expended by frame comparator 112 to determine similarities between graphic data frames is reduced.

Figure 9:
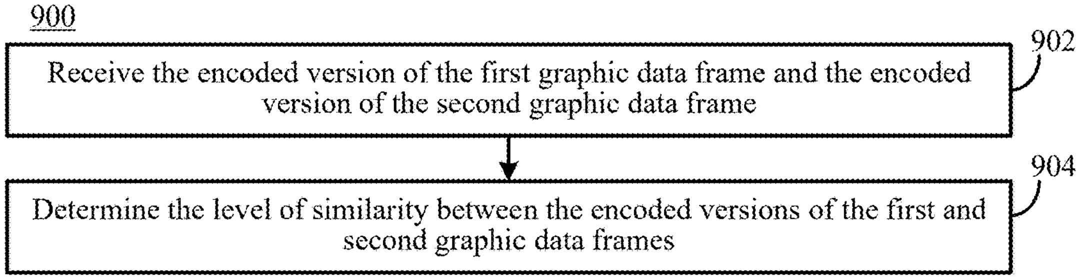
FIG. 9 shows a flowchart of a process for determining a level of similarity between graphic data frames utilizing a machine learning model, in accordance with another example embodiment.

In some embodiments, frame comparator 112 utilizes ML model 706 to encode graphic data frames. In this context, frame comparator 112 determines the level of similarity between encoded graphic data frames. To better understand this operation of system 700, FIG. 7 is described in this alternative aspect with respect to FIG. 9. FIG. 9 shows a flowchart 900 of a process for determining a level of similarity between graphic data frames utilizing a machine learning model, in accordance with another example embodiment. In an embodiment, network adapter 106 of FIG. 7 operates according to the steps of flowchart 900. Note not all steps of flowchart 900 need be performed in all embodiments. Further structural and operational embodiments will be apparent to persons skilled in the relevant art(s) based on the following description of FIG. 9 with respect to FIG. 7.

Flowchart 900 begins with step 902. In step 902, the encoded version of the first graphic data frame and the encoded version of the second graphic data frame are received. For example, suppose prompter 702 of FIG. 7 provides prompts 714 and 722 to ML model 706 to cause ML model 706 to generate encoded versions of graphic data frames 712 and 718, respectively. In this context, ML model 706 stores the encoded versions in memory 708 (e.g., as encoded frame 710) and/or provides the encoded versions as ML output 724 (separately or as a single output) to ML result analyzer 704. In other words, ML result analyzer 704 receives encoded versions of graphic data frames 712 and 718 from ML model 706 (e.g., responsive to prompter 702 prompting ML model 706 to generate the encoded versions). In an alternative (or additional) aspect, ML result analyzer 704 retrieves or otherwise obtains encoded versions of graphic data frames stored in memory 708 (e.g., by ML model 706 or by ML result analyzer 704).

In step 904, the level of similarity between the encoded versions of the first and second graphic data frames is determined. For example, ML result analyzer 704 of FIG. 7 determines a level of similarity between encoded versions of graphic data frames 712 and 718 (e.g., by measuring a distance between embeddings and/or the like). By determining the level of similarity utilizing ML result analyzer 704 of frame comparator 112, the amount of time and compute resources expended by ML model 706 are reduced. Furthermore, in accordance with an embodiment operating in this context, ML model 706 is specialized for encoding graphic data frames (e.g., as a non-limiting example, and not performing analysis on the encoded graphic data frames). In this context, ML model 706 is a lightweight ML model with reduced function and storage size compared to a ML model that is configured to encode graphic data frames and determine similarities between encoded graphic frames. Furthermore, in this context, a neural processing unit (NPU) implementing ML model 706 utilizes fewer compute resources to operate than an NPU implementing a “heavier” ML model.

In accordance with an embodiment of system 700 operating according to flowchart 800 and/or flowchart 900, ML result analyzer 704 determines if the level of similarity determined in step 806 or 904 satisfies a threshold condition. If so, transmission of graphic data frame 718 to processing unit 108 is prevented. In this context, the encoded version of graphic data frame 718 is discarded. If not, ML result analyzer 704 provides a comparison result 726 to processing unit interface 214 to cause graphic data frame 718 to be transmitted to processing unit 108. Furthermore, if the threshold condition is not satisfied, encoded frame 710 is discarded (e.g., by overwriting encoded frame 710 with the encoded version of graphic data frame 718, by transmitting a discard instruction 728 to memory 708, and/or the like).

III. Embodiments for Determining Similarities in Portions of Graphic Data Frames Example embodiments of frame comparators have been described with respect to FIGS. 1-9. In these examples, frame comparator 112 determines a level of similarity between a graphic data frame (or data representative thereof (e.g., embeddings or a hash)) and another (or corresponding data representative thereof). If the level of similarity satisfies a threshold condition, frame comparator 112 prevents transmission of graphic data to processing unit 108, which allows the processing unit to enter and stay in a low-power state. It is further contemplated herein that some embodiments of frame comparator 112 are configured to determine levels of similarity between corresponding portions of graphic data frames. For instance, suppose a graphic data frame is split into multiple sub-frames. In this context, an alternative aspect of frame comparator 112 compares corresponding sub-frames of different graphic data frames to determine which (if any) portions are similar to corresponding portions of the previous graphic data frame. By analyzing separate sub-frames in this manner, such examples of frame comparator 112 are able to reduce the amount of graphic data processing unit 108 processes (e.g., by transmitting portions that include updated/changed graphic data and not transmitting portions that are similar to previous portions).

Figure 10:
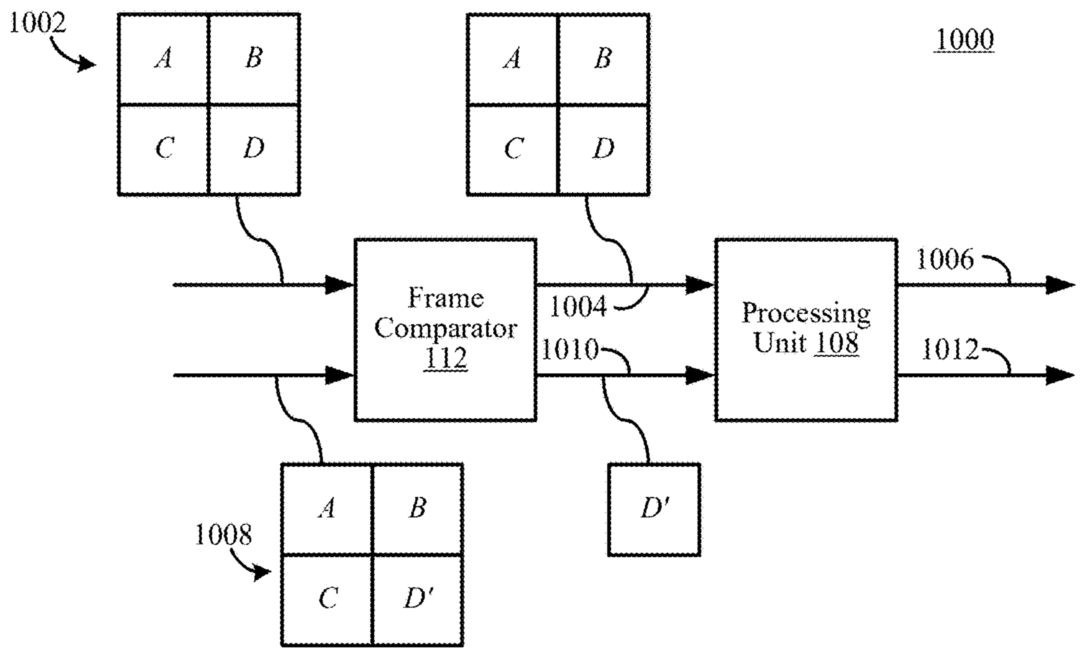
FIG. 10 shows a block diagram of a system for determining a level of similarity between portions of graphic data frames, in accordance with an example embodiment.

Frame comparators that measure similarity between portions of graphic data frames are configured in various ways, in embodiments. For example, FIG. 10 shows a block diagram of a system 1000 for determining a level of similarity between portions of graphic data frames, in accordance with an example embodiment. As shown in FIG. 10, system 1000 comprises frame comparator 112 and processing unit 108, as described with respect to FIG. 1. FIG. 10 also shows example graphic data frames 1002 and 1008 ("frame 1002" and "frame 1008", respectively). As shown in FIG. 10, frame 1002 comprises four portions, labeled "A", "B", "C", and "D", and frame 1008 comprises four portions, labeled, labeled "A", "B", "C", and "D". While frames 1002 and 1008 are split into four portions, embodiments described herein may split frames into any number of portions. Furthermore, portions need not be equal in size or shape. As shown in FIG. 10, frames 1002 and 1008 are split in a grid of portions (e.g., a grid with two rows and two columns of portions). In accordance with an alternative embodiment, frames are split into (e.g., only) row portions. In accordance with another embodiment, frames are split into (e.g., only) column portions. In implementations, frames are split in a manner that enables a level of similarity between a portion of one frame (or data corresponding thereto) and a corresponding portion of another frame to be determined. For instance, as described elsewhere herein, frames 1002 and 1008 are split in a manner that enables levels of similarity between A of 1002 and A of 1008, between B of 1002 and B of 1008, between C of 1002 and C of 1008, and D of 1002 and D' of 1008 to be determined.

Figure 11:
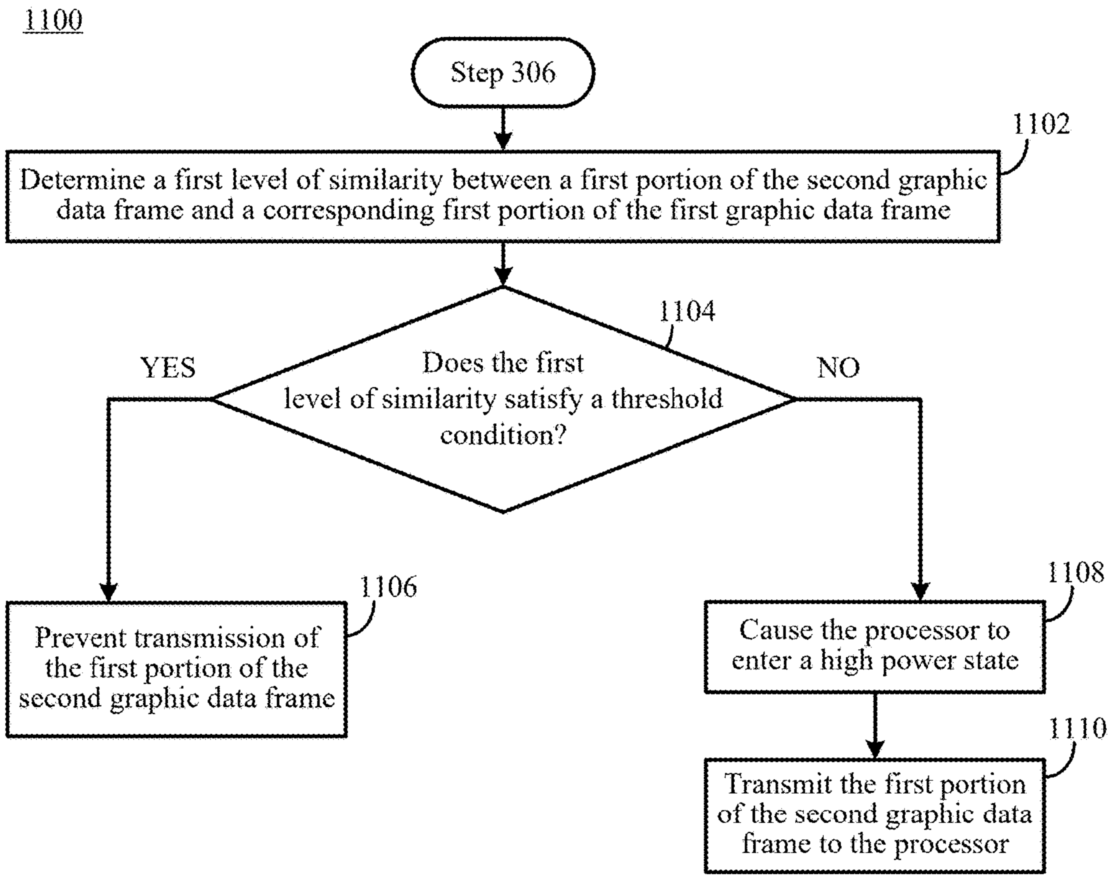
FIG. 11 shows a flowchart of a process for determining a level of similarity between portions of graphic data frames, in accordance with an example embodiment.

To better understand the operation of system 1000, FIG. 10 is described with respect to FIG. 11. FIG. 11 shows a flowchart 1100 of a process for determining a level of similarity between portions of graphic data frames, in accordance with an example embodiment. In an embodiment, frame comparator 112 of FIG. 10 operates according to the steps of flowchart 1100. Note not all steps of flowchart 1100 need be performed in all embodiments. Further structural and operational embodiments will be apparent to persons skilled in the relevant art(s) based on the following descriptions of FIGS. 10 and 11.

Flowchart 1100 begins with step 306, as described with respect to flowchart 300 of FIG. 3, and proceeds to step 1102. In step 1102, a first level of similarity between a first portion of the second graphic data frame and a corresponding first portion of the first graphic data frame is determined. For example, frame comparator 112 of FIG. 10 determines a level of similarity between portion A of graphic data frame 1002 and portion A of graphic data frame 1008, a level of similarity between portion B of graphic data frame 1002 and portion B of graphic data frame 1008, a level of similarity between portion C of graphic data frame 1002 and portion C of graphic data frame 1008, a level of similarity between portion D of graphic data frame 1002 and portion D' of graphic data frame 1008. Depending on the implementation, frame comparator 112 determines levels of similarities between respective portions in parallel or sequentially. In accordance with an embodiment, frame comparator 112 determines which portions of graphic data frames correspond to one another based on pixel data (e.g., X and Y coordinates on an X-Y coordinate axis, such as row and column numbers). In accordance with an embodiment, the level of similarity between portions of graphic data frames is determined utilizing a ML model.

In step 1104, a determination of whether the first level of similarity satisfies a threshold condition is made. For example, frame comparator 112 of FIG. 10 determines whether the level(s) of similarity determined in step 1102 satisfy a threshold condition. Embodiments of frame comparator 112 utilize any of the techniques described herein for determining whether or not a level of similarity between portions satisfies a threshold condition. For instance, in embodiments, frame comparator 112 compares pixels of corresponding portions, compares hashes of corresponding portions (e.g., as further described with respect to FIG. 13, as well as elsewhere herein), utilizes a ML model, and/or performs any other type of technique described herein for comparing graphic data frames (or portions thereof). If the first level of similarity satisfies the threshold condition, flowchart 1100 proceeds to step 1106. Otherwise, flowchart 1100 proceeds to step 1108.

In step 1106, transmission of the first portion of the second graphic data frame is prevented. For example, frame comparator 112 of FIG. 10 prevents transmission of portions of graphic data frame 1008 with a level of similarity to respective portions of graphic data frame 1002 that satisfies a threshold condition. For instance, with respect to the example graphic data frames shown in FIG. 10, frame comparator 112 prevents transmission of portions A, B, and C of graphic data frame 1008. By preventing transmission of these portions, frame comparator 112 reduces the amount of data transmitted to processing unit 108 (and therefore the amount of data processing unit 108 needs to process).

In step 1108, the processor is caused to enter a high power state. For example, frame comparator 112 of FIG. 10 causes processing unit 108 to enter a high power state subsequent to determining a level of similarity between portion D of graphic data frame 1002 and portion D' of graphic data frame 1008 fails to satisfy the threshold condition. Embodiments of frame comparator 112 cause processing unit 108 to "wakeup" in a similar manner as described with respect to step 312 of flowchart 300 of FIG. 3A, as well as elsewhere herein.

In step 1110, the first portion of the second graphic data frame is transmitted to the processor. For example, frame comparator 112 of FIG. 10 causes portion D' to be transmitted to processing unit 108 (e.g., via a graphic update signal 1010). As shown in FIG. 10, graphic update signal 1010 comprises less frame data than a previously transmitted graphic update signal 1010 corresponding to graphic data frame 1002. As also shown in FIG. 10, graphic update signal 1010 causes processing unit 108 to process portion D' of graphic data frame 1008 into processed portion 1012. In accordance with an embodiment, processing unit 108 expends less power and takes less time to generate processed portion 1012 than to generate processed portion 1006 (which corresponds to portions A, B, C, and D of graphic data frame 1002). In this context, by transmitting portions of graphic data frames comprising new graphic data and not transmitting portions that have a level of similarity to previous portions that satisfies a threshold, frame comparator 112 of FIG. 10 reduces power consumption with respect to graphic update operations. Furthermore, in some embodiments, frame comparator 112 updates (e.g., only) data representative of the portion of graphic data frame that was dissimilar to a corresponding existing portion of graphic data frame.

Figure 12:
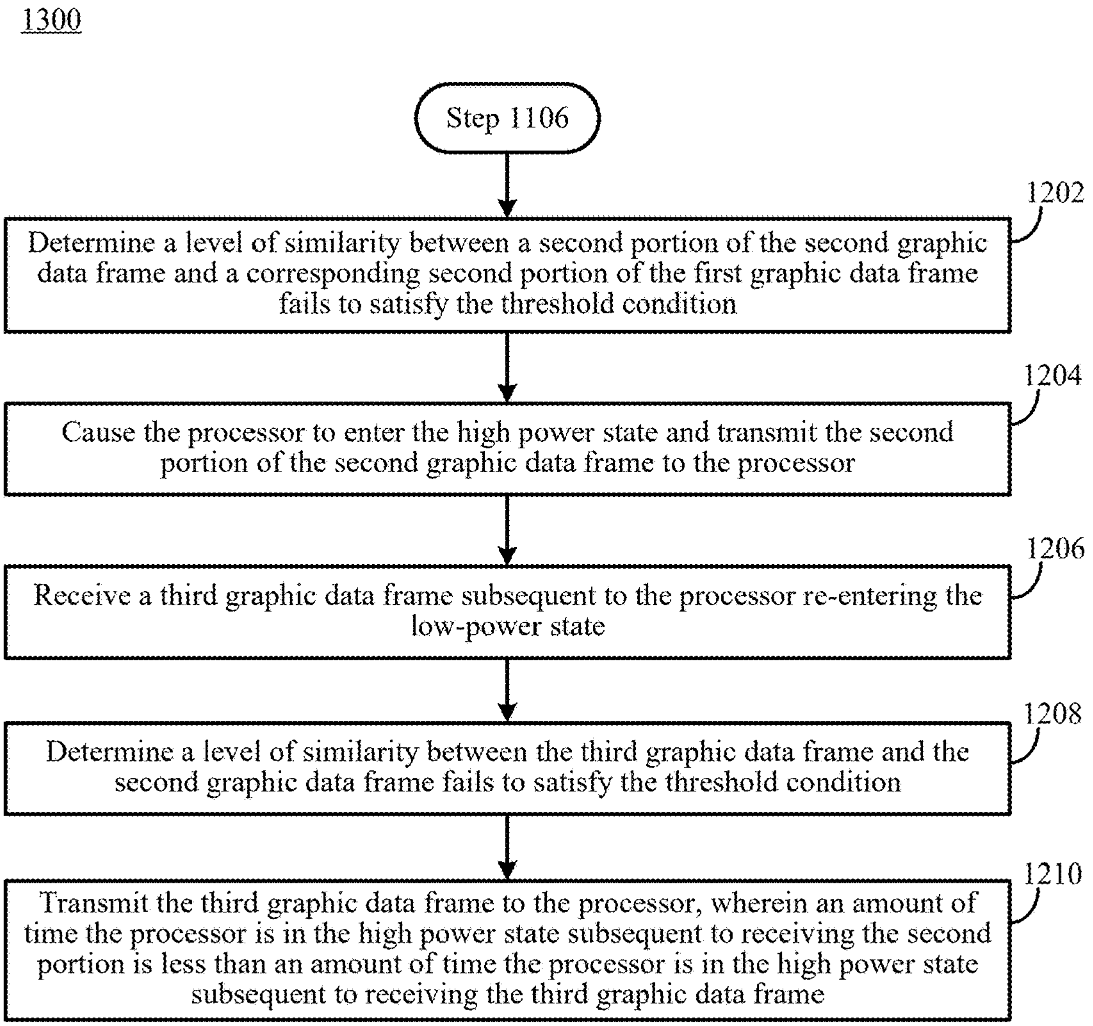
FIG. 12 shows a flowchart of a process for selectively transmitting portions of graphic data frames, in accordance with an example embodiment.

As described herein, embodiments of frame comparator 112 of system 1000 of FIG. 10 operate to selectively transmit and prevent transmission of portions of graphic data frames. Frame comparator 112 of FIG. 10 operates in various ways, in embodiments. For example, FIG. 12 shows a flowchart 1200 of a process for selectively transmitting portions of graphic data frames, in accordance with an example embodiment. In an embodiment, frame comparator 112 of FIG. 10 operates according to the steps of flowchart 1200. Note not all steps of flowchart 1200 need be performed in all embodiments. Further structural and operational embodiments will be apparent to persons skilled in the relevant art(s) based on the following description of FIG. 12 with respect to FIG. 10.

Flowchart 1200 begins with step 1106 of flowchart 1100 of FIG. 11. In this context, frame comparator 112 of FIG. 10 prevents transmission of portions A, B, and C of graphic data frame 1008, as described with respect to step 1106.

Flowchart 1200 proceeds to step 1202. In step 1202, a level of similarity between a second portion of the second graphic data frame and a corresponding second portion of the first graphic data frame is determined to fail to satisfy the threshold condition. For example, frame comparator 112 of FIG. 10 determines a level of similarity between portion D of graphic data frame 1002 and portion D' of graphic data frame 1008 fails to satisfy a threshold condition.

In step 1204, the processor is caused to enter the high power state and the second portion of the second graphic data frame is transmitted to the processor. For example, frame comparator 112 causes processing unit 108 to enter a high power state (e.g., as described with respect to step 1108 of flowchart 1100) and transmits graphic update signal 1010 comprising portion D' (e.g., as described with respect to step 1110 of flowchart 1100). By transmitting the varying portion of the second graphic data frame (i.e., the second portion, portion D') and preventing transmission of the non-varying portion of the second graphic data frame (i.e., the first portion, portions A, B, and C), embodiments of frame comparator 112 of FIG. 10 allow processing unit 108 to enter a high powered state for a shorter period of time than if the entire second graphic data frame was transferred to processing unit 108, thereby reducing power consumed by processing unit 108 during graphics update operations.

In step 1206, a third graphic data frame is received subsequent to the processor re-entering the low-power state. For example, suppose frame comparator 112 of FIG. 10 receives a third graphic data frame not shown in FIG. 10 for brevity. In this example, suppose the third graphic data frame comprises portions A', B', C', and D''. Furthermore, suppose frame comparator 112 determines levels of similarity between portions A and A', portions B and B', portions C and C', and portions D' and D''.

In step 1208, a level of similarity between the third graphic data frame and the second graphic data frame is determined to fail to satisfy the threshold condition. For example, frame comparator 112 of FIG. 10 determines the level of similarity between the third graphic data frame and the respective portions of previously received graphic data frames fails to satisfy a threshold condition. In this context, frame comparator 112 determines the (e.g., entire) displayed graphic data frame is to be updated.

In step 1210, the third graphic data frame is transmitted to the processor, wherein an amount of time the processor is in the high power state subsequent to receiving the second portion is less than amount of time the processor is in the high power state subsequent to receiving the third graphic data frame. For example, frame comparator 112 of FIG. 10 transmits portions A', B', C', and D'' to processing unit 108 to cause processing unit 108 to process the graphic data frame and cause the (e.g., entirety of) graphics displayed by display 110 to be updated. In this context, the amount of time processing unit 108 is in a high power state is longer than (e.g., greater than) the amount of time processing unit was in a high power state subsequent to receiving graphic update signal 1010. In other words, the amount of time processing unit 108, in this context, is in a high power state is reduced when only a portion of a graphic data frame is to be updated rather than the entire graphic data frame.

Figure 13:
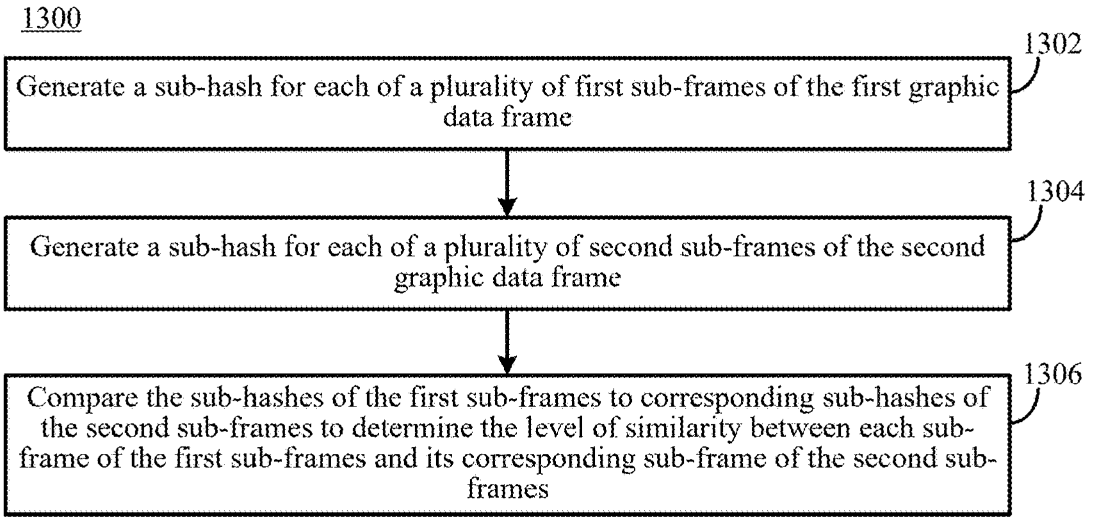
FIG. 13 shows a flowchart of a process for determining a level of similarity between portions of graphic data frames utilizing a hash technique, in accordance with an example embodiment.

As described herein, embodiments of frame comparator 112 of system 1000 of FIG. 10 operate to determine a level of similarity between portions of graphic data frames. In some implementations, frame comparator 112 of system 1000 utilizes pixel comparison techniques (e.g., in a similar manner as described with respect to FIG. 4), hash techniques (e.g., in a similar manner as described with respect to FIGS. 5 and 6), utilizes an ML model (e.g., in a similar manner as described with respect to FIGS. 7 and 8 and/or 7 and 9), and/or utilizes any other technique for determining a level of similarity between graphic data as described elsewhere herein. For instance, in accordance with an embodiment, frame comparator 112 operates to determine a level of similarity based on hashes of portions of graphic data frames (also referred to herein as "sub-hashes" of "sub-frames" of graphic data frames). For instance, FIG. 13 shows a flowchart 1300 of a process for determining a level of similarity between portions of graphic data frames utilizing a hash technique, in accordance with an example embodiment. In an embodiment, frame comparator of FIG. 10 operates according to the steps of flowchart 1300. Note not all steps of flowchart 1300 need be performed in all embodiments. Further structural and operational embodiments will be apparent to persons skilled in the relevant art(s) based on the following description of FIG. 13 with respect to FIGS. 5 and 10.

Flowchart 1300 begins with step 1302. In step 1302, a sub-hash for each of a plurality of first sub-frames of the first graphic data frame are generated. For example, suppose hash generator 502 of FIG. 5 generates sub-hashes for each of portions A, B, C, and D of graphic data frame 1002 of FIG. 10. In accordance with an embodiment, hash generator 502 stores the generated sub-hashes in a buffer (e.g., buffer 506).

In step 1304, a sub-hash for each of a plurality of second sub-frames of the second graphic data frame are generated. For example, suppose hash generator 502 of FIG. 5 generates sub-hashes for each of portions A, B, C, and D' of graphic data frame 1008 of FIG. 10.

In step 1306, the sub-hashes of the first sub-frames are compared to corresponding sub-hashes of the second sub-frames to determine the level of similarity between each sub-frame of the first sub-frames and its corresponding sub-frame of the second sub-frames. For example, hash comparer 504 of FIG. 5 compares a sub-hashes of portions A of graphic data frames 1002 and 1008 to determine a level of similarity between the portions A, compares a sub-hashes of portions B of graphic data frames 1002 and 1008 to determine a level of similarity between the portions B, compares a sub-hashes of portions C of graphic data frames 1002 and 1008 to determine a level of similarity between the portions C, and compares a sub-hashes of portions D and D' of graphic data frames 1002 and 1008 to determine a level of similarity between the portions D and D'.

Thus, an example embodiment of utilizing sub-hashes of respective sub-frames to determine a level of similarity between respective sub-frames has been described with respect to FIGS. 5, 10, and 13. In doing this, embodiments of frame comparator 112 of FIG. 10 are able to selectively determine which subframes are to be updated based on comparisons of sub-hashes (e.g., if a hash of an incoming sub-frame matches a hash of a corresponding previous sub-frame the sub-frame is prevented from being transmitted). For instance, with respect to FIGS. 5 and 10, based on the level of similarities determined in step 1306, hash comparer 504 prevents transmission of portions A, B, and C of graphic data frame 1008 and causes transmission of portion D'.

Furthermore, by utilizing sub-hashes, embodiments of frame comparator 112 can store previously transmitted sub-frames in a smaller storage space, as a hash of the subframe is smaller than the pixel data of the sub-frame, while maintaining the capability to (e.g., only) transmit a portion of incoming graphic data frames that comprise new pixels/data. Thus, the size of memory to store data representative of a previous graphic data frame (e.g., a set of sub-hashes) can be reduced and the amount of time the processing unit 108 is out of a low-power state is reduced, which reduces power consumption.

IV. Integrated Circuit Chip Embodiments

As described herein, embodiments of network adapter 106 are physically separate from processing unit 108. For instance, in accordance with an embodiment, network adapter 106 and processing unit 108 are integrated in separate integrated circuit chips communicatively coupled via a wire, a cable, a trace (e.g., a trace in a printed circuit board of a motherboard), a pin and header (e.g., a pin of a daughterboard coupled to a header of a motherboard), via a wireless communication link, and/or another type of connection or coupling for transmitting signals between two integrated circuit chips. For instance, in accordance with an embodiment, network adapter 106 is implemented as a chipset and processing unit 108 is implemented as a system-on-chip (SOC) physically separate from the chipset. By having network adapter 106 and processing unit 108 implemented in separate integrated circuit chips, power states of the separate chips can be controlled. This configuration allows for several power-saving techniques described herein to be implemented.

Figure 14:
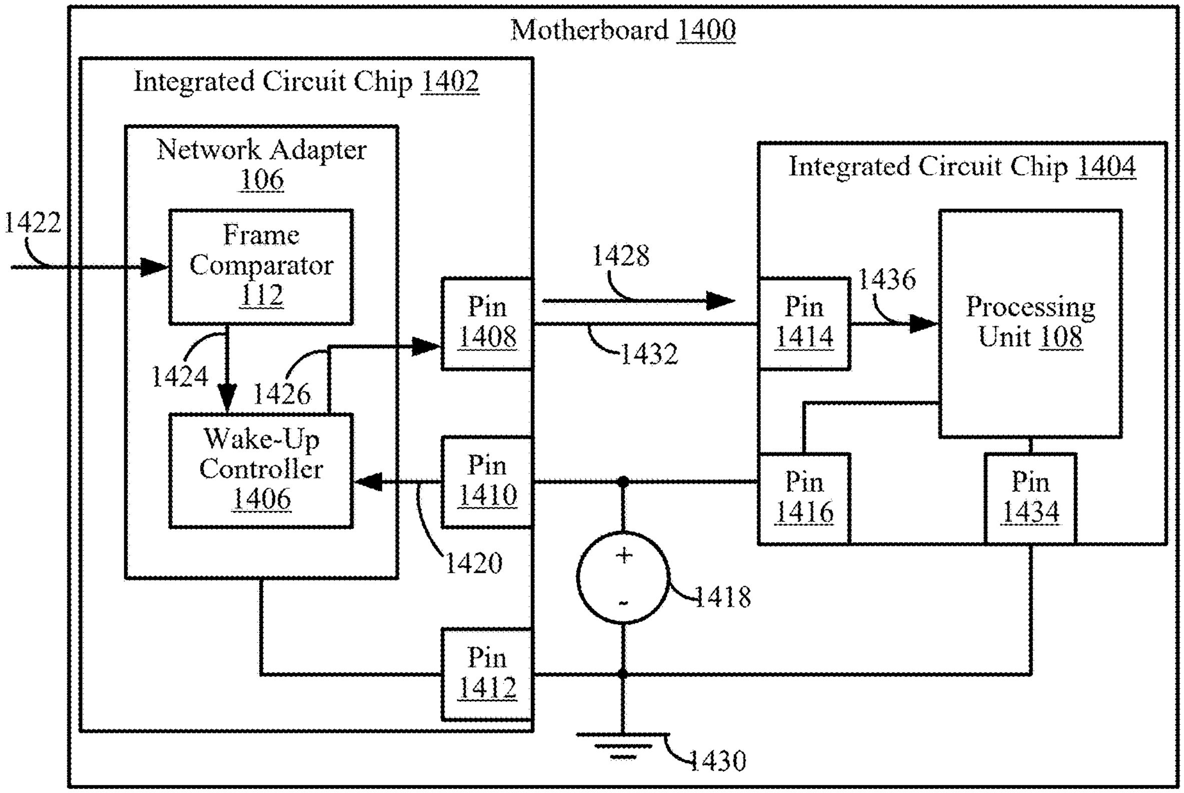
FIG. 14 shows a block diagram of a motherboard for providing a network adapter-based smart streaming front-end for a computing device, in accordance with an example embodiment.

Embodiments of separate integrated circuit chips are configurable in various ways. For instance, FIG. 14 shows a block diagram of a motherboard 1400 for providing a network adapter-based smart streaming front-end for a computing device, in accordance with an example embodiment. Motherboard 1400 is an example motherboard for a computing device such as computing device 102 of FIG. 1. As shown in FIG. 14, motherboard 1400 comprises an integrated circuit chip 1402, an integrated circuit chip 1404, a voltage source 1418, and a ground 1430. Voltage source 1418 provides a voltage supply to motherboard 1400 and its components. Depending on the implementation, voltage source 1418 is physically located on motherboard 1400 or is coupled to motherboard 1400 via a connector (e.g., header pins, a plug, and/or the like). Examples of voltage source 1418 include, but are not limited to, a power supply, a battery, a voltage regulator, and/or the like. Ground 1430 is a ground point for motherboard 1400. In accordance with an embodiment, ground 1430 is a ground plane (e.g., a large area or layer of metal (e.g., copper foil) that serves as a return path for components of motherboard 1400).

Integrated circuit chips 1402 and 1404 are any type of integrated circuit chips or respective chip sets that are physically separate from one another. In accordance with an embodiment, either integrated circuit chip 1402 and/or integrated circuit chip 1404 are packaged in an integrated circuit package. Examples of integrated circuit packages include, but are not limited to, through-hole packages (e.g., single in-line packages, dual in-line packages, etc.), surface mount packages (e.g., lead-less lead-frame packages, flat packages, small outline packages, chip-scale packages, etc.), chip carrier packages (e.g., bump chip carrier packages, lead-less chip carrier packages, etc.), grid array packages (e.g., pin grid array packages, land grid array packages, ball grid array packages, etc.), and/or the like. In accordance with an embodiment, one or more of integrated circuit chip 1402 and/or integrated circuit chip 1404 is implemented in a circuit module. For instance, in a non-limiting example, integrated circuit chip 1402 is implemented in a daughter board coupled to motherboard 1400.

In embodiments, integrated circuit chips 1402 and 1404 comprise various pins and/or connectors for receiving and/or providing signals and/or voltage potentials. For example, as shown in FIG. 14, integrated circuit chip 1402 comprises a pin 1408, a pin 1410, and a pin 1412 and integrated circuit chip 1404 comprises a pin 1414, a pin 1416 and a pin 1434. Pins 1410 and 1416 are respective voltage supply pins of integrated circuit chips 1402 and 1404 and are coupled to voltage source 1418. Pins 1412 and 1434 are respective ground pins of integrated circuit chips 1402 and 1404 and are coupled to ground 1430. Pins 1408 and 1414 are communicatively coupled via a trace 1432. In accordance with an embodiment, pins 1408 and 1414 are general purpose input/output (GPIO) pins. Alternatively, pin 1408 is a pin specialized for providing an output signal from network adapter 106 and pin 1414 is a pin specialized for receiving an input signal for processing unit 108.

As shown in FIG. 14, integrated circuit chip 1402 comprises network adapter 106 (comprising frame comparator 112 and a wake-up controller 1406). In embodiments, network adapter 106 and its components are implemented utilizing hardware and/or firmware (or other software) stored in a memory portion of integrated circuit chip 1402. Frame comparator 112 operates in a manner as described elsewhere herein. Wake-up controller 1406 operates in a manner intended to cause processing unit 108 to exit a low-power state. In accordance with an embodiment, wake-up controller 1406 is an example of processing unit interface 214 of FIG. 2. Alternatively, wake-up controller 1406 is a separate circuit and/or portion of memory from processing unit interface 214.

Figure 15:
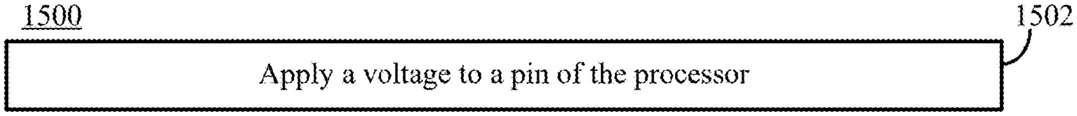
FIG. 15 shows a flowchart of a process for causing a processing unit to exit a low power state, in accordance with an example embodiment.

In order to better understand the operation of wake-up controller 1406, FIG. 14 is described with respect to FIG. 15. FIG. 15 shows a flowchart 1500 of a process for causing a processing unit to exit a low power state, in accordance with an example embodiment. In an embodiment, wake-up controller 1406 operates according to flowchart 1500. Note flowchart 1500 need not be performed in all embodiments.

Further structural and operational embodiments will be apparent to persons skilled in the relevant art(s) based on the following description of FIG. 15 with respect to FIG. 14.

Flowchart 1500 comprises step 1502, which is an example of step 312 of flowchart 300 of FIG. 3A or step 1108 of flowchart 1100 of FIG. 11. In step 1502, a voltage is applied to a pin of a processor. For example, suppose frame comparator 112 of FIG. 14 receives a graphic data frame within a network signal 1422. Further suppose frame comparator 112 determines a level of similarity between the graphic data frame (or a portion thereof) and a previously transmitted graphic data frame (or a corresponding portion thereof) (e.g., the last graphic data frame transmitted to processing unit 108) fails to satisfy a threshold condition. In this context, frame comparator 112 transmits a comparison signal 1424 to wake-up controller 1406. Wake-up controller 1406 receives a potential 1420 on pin 1410 of integrated circuit chip 1404 (e.g., a supply voltage or an input voltage). Responsive to receiving comparison signal 1424, wake-up controller 1406 causes potential 1420 (or another potential) to be output on pin 1408, causing a voltage potential 1428 to be applied to pin 1414 of integrated circuit chip 1404 over trace 1432. Application of potential 1428 to pin 1414 causes a potential 1436 to be applied to processing unit 108, causing processing unit 108 to be woken up or otherwise leave a low-power state. In accordance with an embodiment, by applying a voltage to integrated circuit chip 1404, embodiments of the present disclosure described with respect to FIG. 14 are able to operate at a higher efficiency. For instance, suppose processing unit 108 is able to enter a deep sleep state. In this state, power consumed by processing unit 108 is near (or at) zero (e.g., within a threshold range). For example, the low power state of processing unit 108 in accordance with an embodiment implements a communication protocol that reduces or limits traffic between processing unit 108 and other components of motherboard 1400 (e.g., except for via applying a voltage to pin 1414). In this context, the power consumed by processing unit 108 (and integrated circuit chip 1404) is reduced compared to states that maintain other communication methods of processing unit 108.

V. Embodiments with Multiple Processing Units

Figure 16:
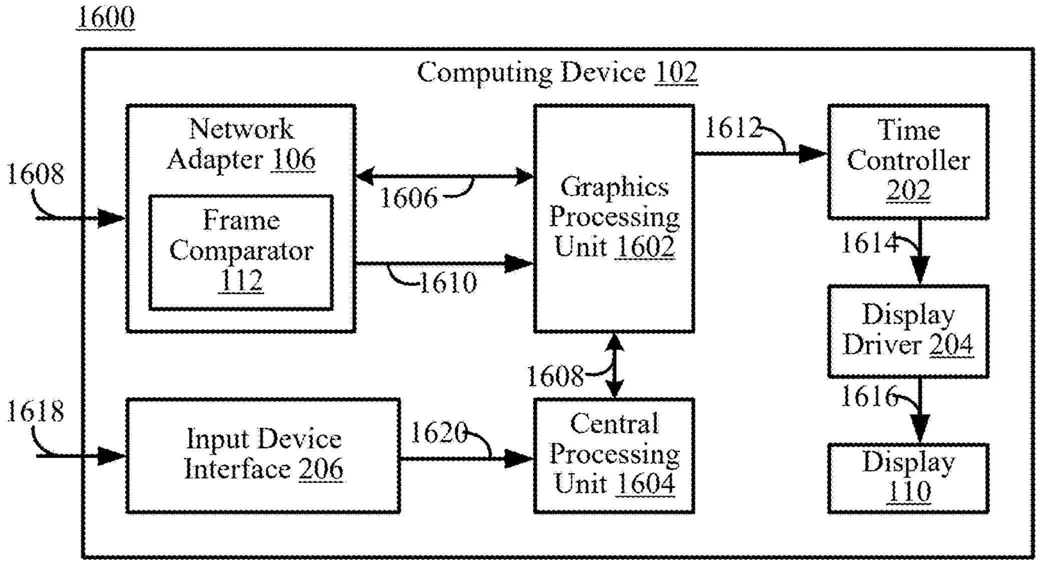
FIG. 16 shows a block diagram of a system for providing a network adapter-based smart streaming front-end for a computing device, in accordance with another example embodiment.

Example FIG. 16 shows a block diagram of a system 1600 for providing a network adapter-based smart streaming front-end for a computing device, in accordance with another example embodiment. System 1600 of FIG. 16 comprises computing device 102. As shown in FIG. 16, computing device 102 comprises network adapter 106 (comprising frame comparator 112 (and, optionally, other components not shown in FIG. 16, such as, but not limited to, network interface 212 and processing unit interface 214 of FIG. 2)), display 110, TCON 202, display driver 204, and input device interface 206, as described with respect to FIG. 2, as well as a graphics processing unit 1602 ("GPU 1602") and a central processing unit 1604 ("CPU 1604"). GPU 1602 is an example of processing unit 108, as described elsewhere herein. In accordance with an embodiment, GPU 1602 and CPU 1604 are co-packaged (e.g., in a single integrated circuit package or module). Alternatively, GPU 1602 and CPU 1604 are in separate packages or chip sets. In accordance with an embodiment, one or more of GPU 1602 and CPU 1604 are implemented as a chipset or integrated circuit on a motherboard (e.g., motherboard 1400). In accordance with an alternative embodiment, one or more of GPU 1602 and CPU 1604 are implemented as a daughterboard or expansion card communicatively coupled to a motherboard (e.g., via a header, a cable, or other connector of the motherboard). As shown in FIG. 16, GPU 1602 is communicatively coupled to network adapter 106 via a communication link 1606 (which is an example of communication link 210) and CPU 1604 via a communication link 1608.

GPU 1602 is configured to perform graphics processing tasks and CPU 1604 is configured to perform other processing tasks. In embodiments, GPU 1602 and CPU 1604 are able to enter different power states. For instance, in accordance with an embodiment, GPU 1602 enters a low power state if new graphics data does not need to be provided to TCON 202. By having GPU 1602 physically separate from CPU 1604, CPU 1604 is able to enter a high power state (e.g., to perform a processing task other than graphics processing) without GPU 1602 entering a high power state, thereby conserving power when performing tasks unrelated to graphics processing while graphics data remains unchanged. Furthermore, in some implementations, GPU 1602 performs graphics processing tasks without CPU 1604 exiting a low power state, thereby conserving power when (e.g., only) performing tasks related to graphics processing.

Computing device 102 of FIG. 16 operates similar to computing device 102 of FIG. 2. For instance, network adapter 106 receives network signal 1608 comprising a graphic data frame and determines whether the graphic data frame is similar to a previously transmitted graphics data frame. If the level of similarity fails to satisfy a threshold, network adapter 106 wakes up GPU 1602 via wakeup signal 1610 (e.g., if GPU 1602 is in a low power state) and transmits the graphic data frame (or a portion thereof) via communication link 1606, otherwise frame comparator 112 prevents transmission of the graphic data frame and wakeup of GPU 1602. If a graphic data frame (or a portion thereof) is transmitted to GPU 1602, GPU 1602 processes the graphic data frame and provides processed graphic data frame 1612 to TCON 202. TCON 202 stores the processed graphic data frame and provides a control signal 1614 to display driver 204. Responsive to receiving control signal 1614, display driver 204 drives display 110 via drive signal 1616 to display graphic data corresponding to processed graphic data frame 1612.

VI. Server-Side Frame Comparator Embodiments

Figure 17:
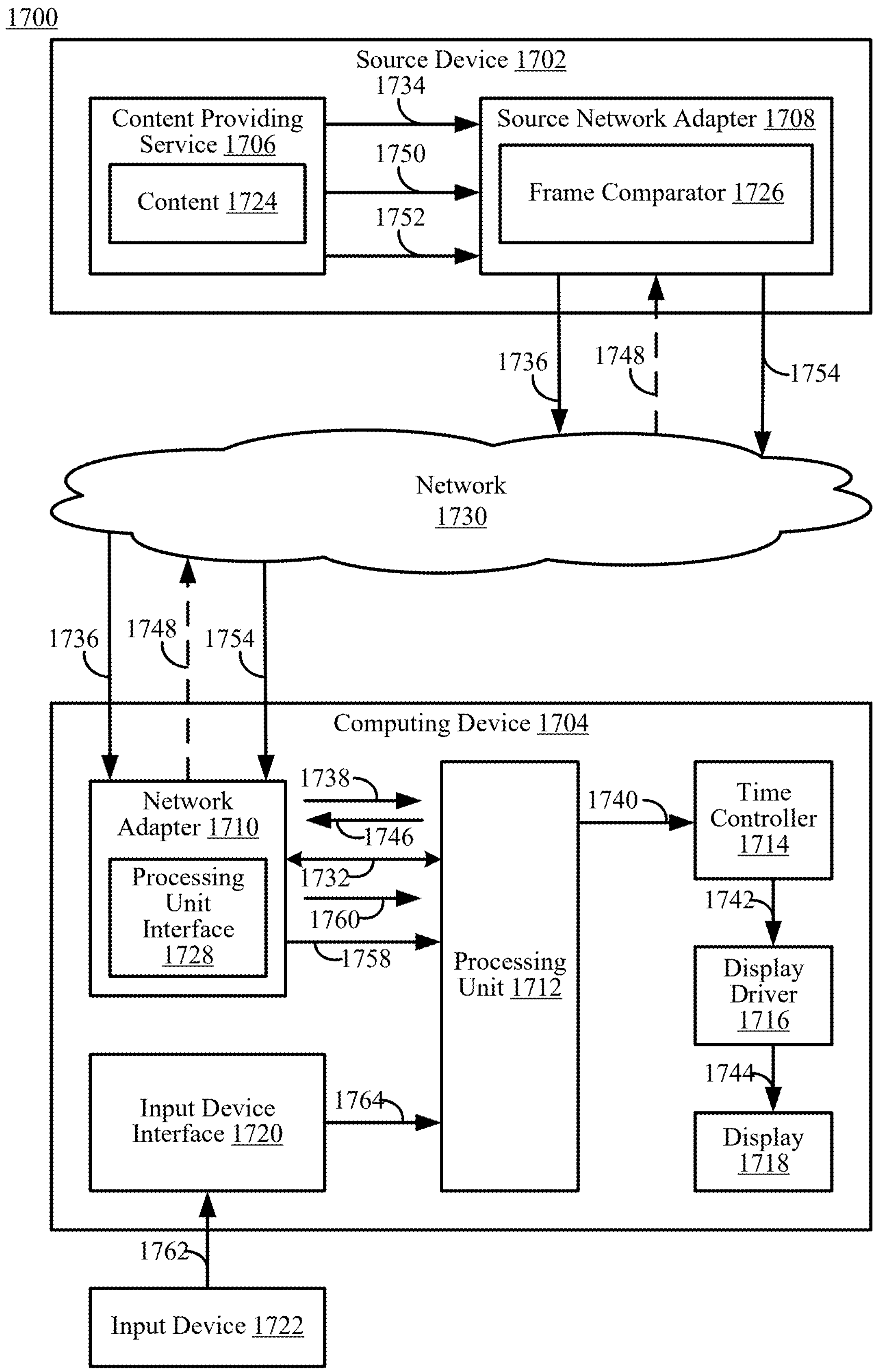
FIG. 17 shows a block diagram of a system for providing a network adapter-based smart streaming front-end for a computing device, in accordance with another example embodiment.

Embodiments of front-end network adapters comprising a frame comparator have been described with respect to FIGS. 1-16. In an alternative (or additional) aspect of the present disclosure, a frame comparator is implemented in a server-side device (e.g., a network adapter of a source device or a network adapter of a server or computer communicatively coupled to a source device). Server-side network adapters comprising frame comparators are configured in various ways. For instance, FIG. 17 shows a block diagram of a system 1700 for providing a server-side network adapter-based smart streaming front-end for a computing device, in accordance with another example embodiment. As shown in FIG. 17, system 1700 comprises a source device 1702, a computing device 1704, and an input device 1722. Source device 1702 and computing device 1704 are communicatively coupled via a network 1730. In examples, network 1730 comprises one or more networks such as local area networks (LANs), wide area networks (WANs), enterprise networks, the Internet, etc. In examples, network 1730 comprises one or more wired and/or wireless portions. The features of system 1700 are described in detail as follows.

Input device 1722 is any type of device that enables a user to enter commands and/or information into computing device 1702, e.g., as described with respect to input device 208 of FIG. 2.

Source device 1702 is any type of network-accessible computing device, e.g., as described with respect to source device 104 of FIG. 1. As shown in FIG. 17, source device 1702 comprises a content providing service 1706 and a source network adapter 1708 (which comprises a frame comparator 1726). Content providing service 1706 is an application (e.g., a back-end application) for hosting, providing, and/or managing content 1724. Network adapter 1708 is a hardware component configured to facilitate communication between source device 1702 and other devices over network 1730. In accordance with an embodiment, source device 1702 provides (e.g., streams) content 1724 over network 1730 via network adapter 1708. Frame comparator 1726 operates in a similar manner to frame comparator 112 of FIG. 1. In other words, frame comparator 1726 analyzes graphic data frames of content 1724 prior to being streamed over network 1730 and selectively transmits or prevents transmission of all or a portion of a graphic data frame.

Computing device 1702 is any type of stationary or mobile processing device, e.g., as described with respect to computing device 102 of FIG. 1. As shown in FIG. 17, computing device 1702 comprises a network adapter 1710 (comprising a processing unit interface 1728), a processing unit 1712, a TCON 1714, a display driver 1716, a display 1718, and an input interface 1720. Network adapter 1710, processing unit 1712, TCON 1714, display driver 1716, display 1718, input interface 1720, and processing unit interface 1728 operate in a similar manner to network adapter 106, processing unit 108, TCON 202, display driver 204, display 110, input interface 206, and processing unit interface 1728, with a few exceptions. For instance, in some embodiments, network adapter 1710 does not comprise a frame comparator. For example, with respect to FIG. 17, frame comparison operations are performed by frame comparator 1726 of network adapter 1708 on source device 1702. In this context, the amount of compute resources expended by computing device 102 are further reduced.

Figure 18:
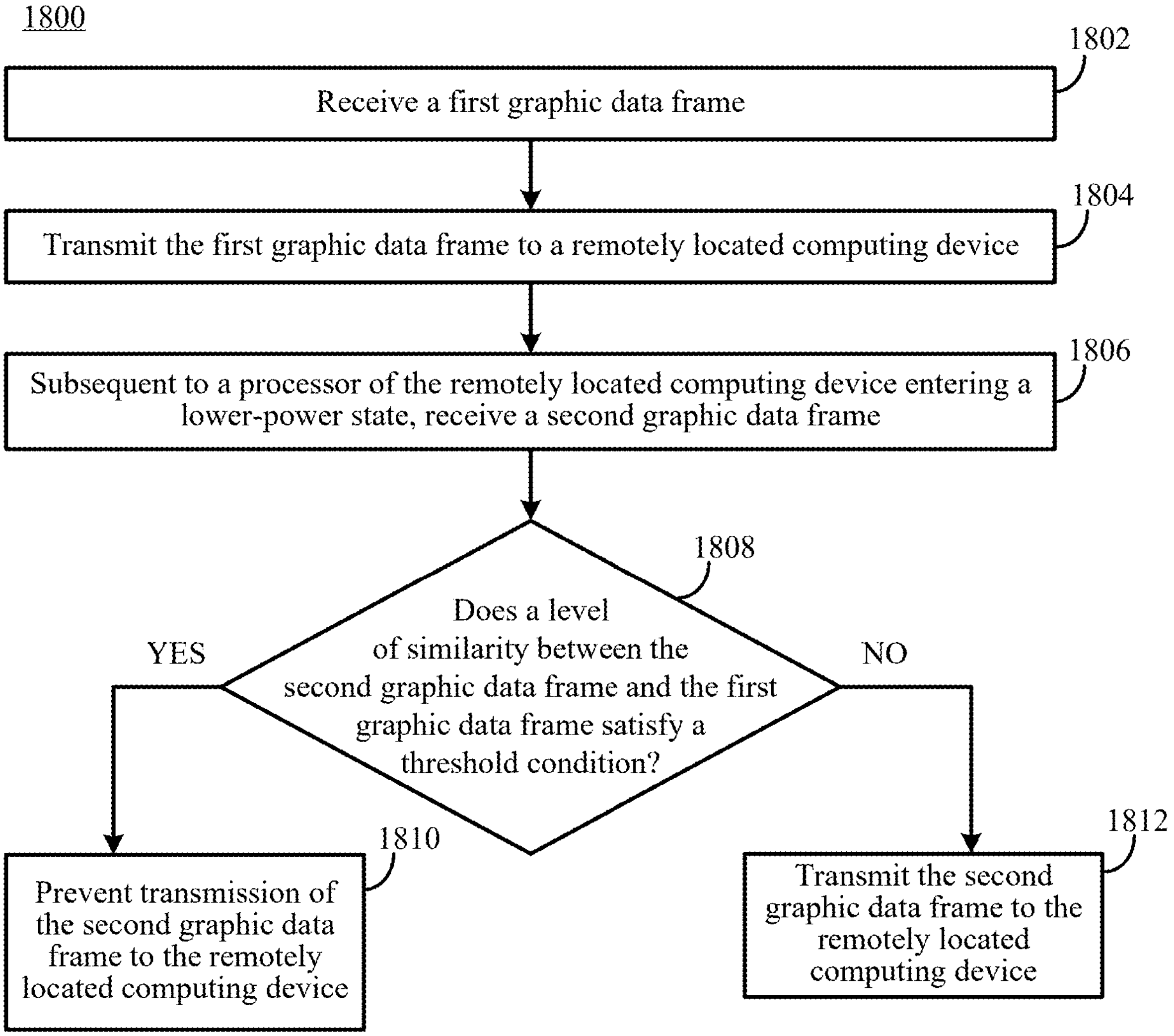
FIG. 18 shows a flowchart of a process for providing a network adapter-based smart streaming front-end for a computing device, in accordance with another example embodiment.

To better understand the operation of system 1700, FIG. 17 is described with respect to FIG. 18. FIG. 18 shows a flowchart 1800 of a process for providing a network adapter-based smart streaming front-end for a computing device, in accordance with another example embodiment. In an embodiment, network adapter 1708 operates according to the steps of flowchart 1800. Note not all steps of flowchart 1800 need be performed in all embodiments. Further structural and operational embodiments will be apparent to persons skilled in the relevant art(s) based on the following descriptions of FIGS. 17 and 18.

Flowchart 1800 begins with step 1802. In step 1802, a first graphic data frame is received. For example, source network adapter 1708 of FIG. 17 receives graphic data frame 1734 from content providing service 1706.

In step 1804, the first graphic data frame is transmitted to a remotely located computing device. For example, source network adapter 1708 transmits graphic data frame 1734 to computing device 1704 over network 1704 via a network signal 1736. In accordance with an embodiment, network signal 1736 comprises one or more network data packets. As shown in FIG. 17, network adapter 1710 of computing device 1704 receives network signal 1736 and processing unit interface 1728 transmits a graphic update signal 1738 (comprising graphic data frame 1734) to processing unit 1712 over a communication link 1732 (which is a further example of communication link 210). Processing unit 1712 processes graphic data frame 1734 and provides a processed graphic data frame 1740 to TCON 1714. TCON 1714 provides a control signal 1742 to display driver 1716 to cause display driver 1716 to drive display 1718 (using drive signal 17144) to display graphic information based on processed graphic data frame 1740.

In embodiments, processing unit 1712 enters a low power state (e.g., in a similar manner to processing unit 108 of FIG. 1 entering a low power state, as described elsewhere herein) to reduce power consumption. In some embodiments, and as shown in FIG. 17, processing unit 1712 provides a sleep indication 1746 to network adapter 1710 to indicate processing unit 1712 is in or is entering the low power state. Furthermore, in some embodiments, and as optionally shown in FIG. 17, network adapter 1710 transmits an indication 1748 to source network adapter 1708 to indicate processing unit 1712 is in the low power state.

In step 1806, subsequent to a processor of the remotely located computing device entering a low-power state, a second graphic data frame is received. For example, source network adapter 1708 of FIG. 17 receives graphic data frame 1750.

In step 1808, a determination of whether a level of similarity between the second graphic data frame and the first graphic data frame satisfies a threshold condition is made. For example, frame comparator 1726 determines a level of similarity between graphic data frame 1734 and graphic data frame 1750 and determines if the level of similarity satisfies a threshold condition. If the level of similarity satisfies the threshold condition, flowchart 1800 proceeds to step 1810. Otherwise, flowchart 1800 proceeds to step 1812. In embodiments, frame comparator 1726 utilizes techniques similar to those described with respect to frame comparator 112 elsewhere herein in order to determine if the level of similarity satisfies a threshold condition (e.g., by comparing pixels, utilizing hash comparison techniques, utilizing an ML model, comparing portions of frames, and/or any other technique described elsewhere herein).

In step 1810, transmission of the second graphic data frame to the remotely located computing device is prevented. For example, as shown in FIG. 17, frame comparator 1726 determines a level of similarity between graphic data frames 1750 and 1734 satisfies a threshold condition and prevents transmission of graphic data frame 1750 over network 1730. By selectively preventing transmission of graphic data frames in this way, frame comparator 1726 allows processing unit 1712 to remain in a low power state, thereby reducing power consumption of processing unit 1712. Furthermore, selectively preventing transmission of graphic data frames reduces network traffic over network 1730, as redundant graphic data frames are not sent to network adapter 1710. Furthermore, since frame comparison occurs on source device 1702, power consumption of network adapter 1710 is further reduced.

In step 1812, the second graphic data frame is transmitted to the remotely located computing device. For example, as shown in FIG. 17, frame comparator 1726 receives a graphic data frame 1752 and determines a level of similarity between graphic data frames 1734 and 1752 satisfies a threshold condition. In this context, source network adapter 1708 transmits graphic data frame 1752 to computing device 1704 over network 1730 via network signal 1754. Network adapter 1710 receives network signal 1754, (e.g., utilizing processing unit interface 1728) wakes up processing unit 1712 (e.g., by transmitting a wakeup signal 1758), and transmits a graphic update signal 1760 (comprising graphic data frame 1752) over communication link 1732. Processing unit 1712 processes graphic data frame 1752 in a manner similar to the techniques described elsewhere herein and causes graphic data corresponding to the processed version of graphic data frame 1752 to be displayed by display 1718.

VII. Example Computer System Implementation

Embodiments of network adapter-based smart streaming described herein are implemented in hardware, or hardware combined with one or both of software and/or firmware. For example, frame comparator 112, TCON 202, display driver 204, input device interface 206, network interface 212, processing unit interface 214, hash generator 502, hash comparer 504, prompter 702, ML result analyzer 704, ML model 706, wake-up controller 1406, content providing service 1706, TCON 1714, display driver 1716, input device interface 1720, frame comparator 1726, processing unit interface 1728, and/or the components described therein, and/or the steps of flowcharts 300, 320, 400, 600, 800, 900, 1100, 1200, 1300, 1500, and/or 1800, are each implemented as computer program code/instructions configured to be executed in one or more processors and stored in a computer readable storage medium. Alternatively, network adapter 106, processing unit 108, frame comparator 112, TCON 202, display driver 204, input device interface 206, network interface 212, processing unit interface 214, hash generator 502, hash comparer 504, buffer 506, prompter 702, ML result analyzer 704, ML model 706, memory 708, wake-up controller 1406, GPU 1602, CPU 1604, content providing service 1706, source network adapter 1708, network adapter 1710, processing unit 1712, TCON 1714, display driver 1716, input device interface 1720, frame comparator 1726, processing unit interface 1728, and/or the components described therein, and/or the steps of flowcharts 300, 320, 400, 600, 800, 900, 1100, 1200, 1300, 1500, and/or 1800 are implemented in one or more SoCs (system on chip). An SoC includes an integrated circuit chip that includes one or more of a processor (e.g., a central processing unit (CPU), microcontroller, microprocessor, digital signal processor (DSP), etc.), memory, one or more communication interfaces, and/or further circuits, and optionally executes received program code and/or include embedded firmware to perform functions.

Figure 19:
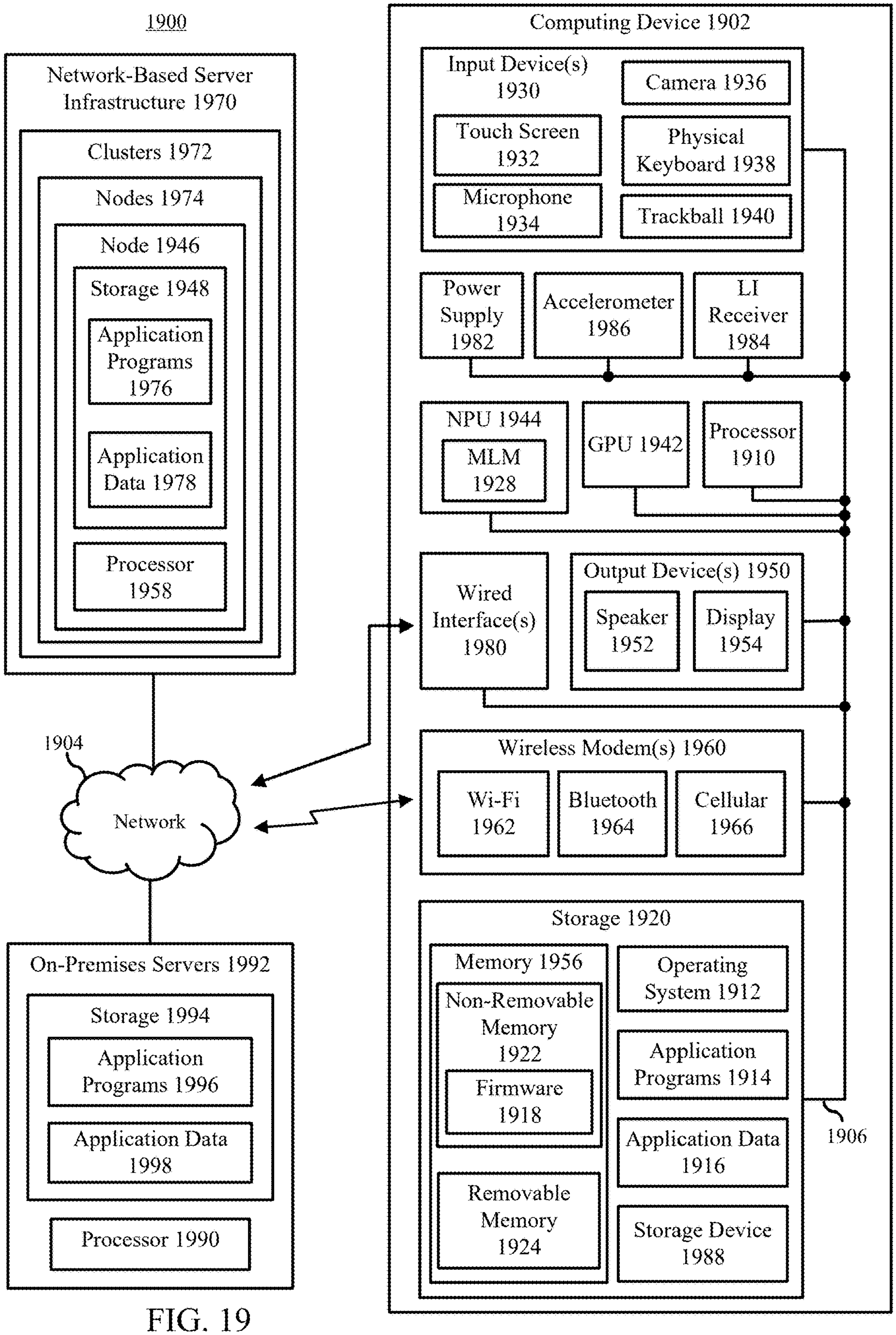
FIG. 19 shows a block diagram of an example computing environment in which embodiments may be implemented.

Embodiments disclosed herein can be implemented in one or more computing devices that are mobile (a mobile device) and/or stationary (a stationary device) and include any combination of the features of such mobile and stationary computing devices. Examples of computing devices in which embodiments are implementable are described as follows with respect to FIG. 19. FIG. 19 shows a block diagram of an exemplary computing environment 1900 that includes a computing device 1902. Computing device 1902 is an example of computing device 102, source device 104, system 1600, source device 1702, or computing device 1704, which each include one or more of the components of computing device 1902. In some embodiments, computing device 1902 is communicatively coupled with devices (not shown in FIG. 19) external to computing environment 1900 via network 1904. Network 1904 is an example of network 116 or network 1730. Network 1904 comprises one or more networks such as local area networks (LANs), wide area networks (WANs), enterprise networks, the Internet, etc. In examples, network 1904 includes one or more wired and/or wireless portions. In some examples, network 1904 additionally or alternatively includes a cellular network for cellular communications. Computing device 1902 is described in detail as follows.

Computing device 1902 can be any of a variety of types of computing devices. Examples of computing device 1902 include a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. In an alternative example, computing device 1902 is a stationary computing device such as a desktop computer, a personal computer (PC), a stationary server device, a minicomputer, a mainframe, a supercomputer, etc.

As shown in FIG. 19, computing device 1902 includes a variety of hardware and software components, including a processor 1910, a storage 1920, a graphics processing unit (GPU) 1942, a neural processing unit (NPU) 1944, one or more input devices 1930, one or more output devices 1950, one or more wireless modems 1960, one or more wired interfaces 1980, a power supply 1982, a location information (LI) receiver 1984, and an accelerometer 1986. Storage 1920 includes memory 1956, which includes non-removable memory 1922 and removable memory 1924, and a storage device 1988. Storage 1920 also stores an operating system 1912, application programs 1914, and application data 1916. Wireless modem(s) 1960 include a Wi-Fi modem 1962, a Bluetooth modem 1964, and a cellular modem 1966. Output device(s) 1950 includes a speaker 1952 and a display 1954. Input device(s) 1930 includes a touch screen 1932, a microphone 1934, a camera 1936, a physical keyboard 1938, and a trackball 1940. Not all components of computing device 1902 shown in FIG. 19 are present in all embodiments, additional components not shown may be present, and in a particular embodiment any combination of the components are present. In examples, components of computing device 1902 are mounted to a circuit card (e.g., a motherboard (e.g., motherboard 1400)) of computing device 1902, integrated in a housing of computing device 1902, or otherwise included in computing device 1902. The components of computing device 1902 are described as follows.

In embodiments, a single processor 1910 (e.g., central processing unit (CPU), microcontroller, a microprocessor, signal processor, ASIC (application specific integrated circuit), and/or other physical hardware processor circuit) or multiple processors 1910 are present in computing device 1902 for performing such tasks as program execution, signal coding, data processing, input/output processing, power control, and/or other functions. In examples, processor 1910 is a single-core or multi-core processor, and each processor core is single-threaded or multithreaded (to provide multiple threads of execution concurrently). Processor 1910 is configured to execute program code stored in a computer readable medium, such as program code of operating system 1912 and application programs 1914 stored in storage 1920. The program code is structured to cause processor 1910 to perform operations, including the processes/methods disclosed herein. Operating system 1912 controls the allocation and usage of the components of computing device 1902 and provides support for one or more application programs 1914 (also referred to as "applications" or "apps"). In examples, application programs 1914 include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. In examples, processor(s) 1910 includes one or more general processors (e.g., CPUs) configured with or coupled to one or more hardware accelerators, such as one or more NPUs 1944 and/or one or more GPUs 1942.

Any component in computing device 1902 can communicate with any other component according to function, although not all connections are shown for ease of illustration. For instance, as shown in FIG. 19, bus 1906 is a multiple signal line communication medium (e.g., conductive traces in silicon, metal traces along a motherboard, wires, etc.) present to communicatively couple processor 1910 to various other components of computing device 1902, although in other embodiments, an alternative bus, further buses, and/or one or more individual signal lines is/are present to communicatively couple components. Bus 1906 represents one or more of any of several types of bus structures, including a memory bus or memory controller, a peripheral bus, an accelerated graphics port, and a processor or local bus using any of a variety of bus architectures.

Storage 1920 is physical storage that includes one or both of memory 1956 and storage device 1988, which store operating system 1912, application programs 1914, and application data 1916 according to any distribution. Non-removable memory 1922 includes one or more of RAM (random access memory), ROM (read only memory), flash memory, a solid-state drive (SSD), a hard disk drive (e.g., a disk drive for reading from and writing to a hard disk), and/or other physical memory device type. In examples, non-removable memory 1922 includes main memory and is separate from or fabricated in a same integrated circuit as processor 1910. As shown in FIG. 19, non-removable memory 1922 stores firmware 1918 that is present to provide low-level control of hardware. Examples of firmware 1918 include BIOS (Basic Input/Output System, such as on personal computers) and boot firmware (e.g., on smart phones). In examples, removable memory 1924 is inserted into a receptacle of or is otherwise coupled to computing device 1902 and can be removed by a user from computing device 1902. Removable memory 1924 can include any suitable removable memory device type, including an SD (Secure Digital) card, a Subscriber Identity Module (SIM) card, which is well known in GSM (Global System for Mobile Communications) communication systems, and/or other removable physical memory device type. In examples, one or more of storage device 1988 are present that are internal and/or external to a housing of computing device 1902 and are or are not removable. Examples of storage device 1988 include a hard disk drive, a SSD, a thumb drive (e.g., a USB (Universal Serial Bus) flash drive), or other physical storage device.

One or more programs are stored in storage 1920. Such programs include operating system 1912, one or more application programs 1914, and other program modules and program data. Examples of such application programs include computer program logic (e.g., computer program code/instructions) for implementing frame comparator 112, TCON 202, display driver 204, input device interface 206, network interface 212, processing unit interface 214, hash generator 502, hash comparer 504, prompter 702, ML result analyzer 704, ML model 706, wake-up controller 1406, content providing service 1706, TCON 1714, display driver 1716, input device interface 1720, frame comparator 1726, processing unit interface 1728, and/or the components described therein, and/or the steps of flowcharts 300, 320, 400, 600, 800, 900, 1100, 1200, 1300, 1500, and/or 1800.

Storage 1920 also stores data used and/or generated by operating system 1912 and application programs 1914 as application data 1916. Examples of application data 1916 include web pages, text, images, tables, sound files, video data, and other data. In examples, application data 1916 is sent to and/or received from one or more network servers or other devices via one or more wired or wireless networks. Storage 1920 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

In examples, a user enters commands and information into computing device 1902 through one or more input devices 1930 and receives information from computing device 1902 through one or more output devices 1950. Input device(s) 1930 includes one or more of touch screen 1932, microphone 1934, camera 1936, physical keyboard 1938 and/or trackball 1940 and output device(s) 1950 includes one or more of speaker 1952 and display 1954. Each of input device(s) 1930 and output device(s) 1950 are integral to computing device 1902 (e.g., built into a housing of computing device 1902) or are external to computing device 1902 (e.g., communicatively coupled wired or wirelessly to computing device 1902 via wired interface(s) 1980 and/or wireless modem(s) 1960). Further input devices 1930 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1954 displays information, as well as operating as touch screen 1932 by receiving user commands and/or other information (e.g., by touch, finger gestures, virtual keyboard, etc.) as a user interface. Any number of each type of input device(s) 1930 and output device(s) 1950 are present, including multiple microphones 1934, multiple cameras 1936, multiple speakers 1952, and/or multiple displays 1954.

In embodiments where GPU 1942 is present, GPU 1942 includes hardware (e.g., one or more integrated circuit chips that implement one or more of processing cores, multiprocessors, compute units, etc.) configured to accelerate computer graphics (two-dimensional (2D) and/or three-dimensional (3D)), perform image processing, and/or execute further parallel processing applications (e.g., training of neural networks, etc.). Examples of GPU 1942 perform calculations related to 3D computer graphics, include 2D acceleration and framebuffer capabilities, accelerate memory-intensive work of texture mapping and rendering polygons, accelerate geometric calculations such as the rotation and translation of vertices into different coordinate systems, support programmable shaders that manipulate vertices and textures, perform oversampling and interpolation techniques to reduce aliasing, and/or support very high-precision color spaces.

In examples, NPU 1944 (also referred to as an "artificial intelligence (AI) accelerator" or "deep learning processor (DLP)") is a processor or processing unit configured to accelerate artificial intelligence and machine learning applications, such as execution of machine learning (ML) model (MLM) 1928. In an example, NPU 1944 is configured for a data-driven parallel computing and is highly efficient at processing massive multimedia data such as videos and images and processing data for neural networks. NPU 1944 is configured for efficient handling of AI-related tasks, such as speech recognition, background blurring in video calls, photo or video editing processes like object detection, etc.

In embodiments disclosed herein that implement ML models, NPU 1944 can be utilized to execute such ML models, of which MLM 1928 is an example. For instance, where applicable, MLM 1928 is a generative AI model that generates content that is complex, coherent, and/or original. For instance, a generative AI model can create sophisticated sentences, lists, ranges, tables of data, images, essays, and/or the like. An example of a generative AI model is a language model. A language model is a model that estimates the probability of a token or sequence of tokens occurring in a longer sequence of tokens. In this context, a "token" is an atomic unit that the model is training on and making predictions on. Examples of a token include, but are not limited to, a word, a character (e.g., an alphanumeric character, a blank space, a symbol, etc.), a sub-word (e.g., a root word, a prefix, or a suffix). In other types of models (e.g., image based models) a token may represent another kind of atomic unit (e.g., a subset of an image). Examples of language models applicable to embodiments herein include large language models (LLMs), text-to-image AI image generation systems, text-to-video AI generation systems, etc. A large language model (LLM) is a language model that has a high number of model parameters. In examples, an LLM has millions, billions, trillions, or even greater numbers of model parameters. Model parameters of an LLM are the weights and biases the model learns during training. Some implementations of LLMs are transformer-based LLMs (e.g., the family of generative pre-trained transformer (GPT) models). A transformer is a neural network architecture that relies on self-attention mechanisms to transform a sequence of input embeddings into a sequence of output embeddings (e.g., without relying on convolutions or recurrent neural networks).

In further examples, NPU 1944 is used to train MLM 1928. To train MLM 1928, training data is that includes input features (attributes) and their corresponding output labels/target values (e.g., for supervised learning) is collected. A training algorithm is a computational procedure that is used so that MLM 1928 learns from the training data. Parameters/weights are internal settings of MLM 1928 that are adjusted during training by the training algorithm to reduce a difference between predictions by MLM 1928 and actual outcomes (e.g., output labels). In some examples, MLM 1928 is set with initial values for the parameters/weights. A loss function measures a dissimilarity between predictions by MLM 1928 and the target values, and the parameters/weights of MLM 1928 are adjusted to minimize the loss function. The parameters/weights are iteratively adjusted by an optimization technique, such as gradient descent. In this manner, MLM 1928 is generated through training by NPU 1944 to be used to generate inferences based on received input feature sets for particular applications. MLM 1928 is generated as a computer program or other type of algorithm configured to generate an output (e.g., a classification, a prediction/inference) based on received input features, and is stored in the form of a file or other data structure.

In examples, such training of MLM 1928 by NPU 1944 is supervised or unsupervised. According to supervised learning, input objects (e.g., a vector of predictor variables) and a desired output value (e.g., a human-labeled supervisory signal) train MLM 1928. The training data is processed, building a function that maps new data on expected output values. Example algorithms usable by NPU 1944 to perform supervised training of MLM 1928 in particular implementations include support-vector machines, linear regression, logistic regression, Naïve Bayes, linear discriminant analysis, decision trees, K-nearest neighbor algorithm, neural networks, and similarity learning.

In an example of supervised learning where MLM 1928 is an LLM, MLM 1928 can be trained by exposing the LLM to (e.g., large amounts of) text (e.g., predetermined datasets, books, articles, text-based conversations, webpages, transcriptions, forum entries, and/or any other form of text and/or combinations thereof). In examples, training data is provided from a database, from the Internet, from a system, and/or the like. Furthermore, an LLM can be fine-tuned using Reinforcement Learning with Human Feedback (RLHF), where the LLM is provided the same input twice and provides two different outputs and a user ranks which output is preferred. In this context, the user's ranking is utilized to improve the model. Further still, in example embodiments, an LLM is trained to perform in various styles, e.g., as a completion model (a model that is provided a few words or tokens and generates words or tokens to follow the input), as a conversation model (a model that provides an answer or other type of response to a conversation-style prompt), as a combination of a completion and conversation model, or as another type of LLM model.

According to unsupervised learning, MLM 1928 is trained to learn patterns from unlabeled data. For instance, in embodiments where MLM 1928 implements unsupervised learning techniques, MLM 1928 identifies one or more classifications or clusters to which an input belongs. During a training phase of MLM 1928 according to unsupervised learning, MLM 1928 tries to mimic the provided training data and uses the error in its mimicked output to correct itself (i.e., correct weights and biases). In further examples, NPU 1944 perform unsupervised training of MLM 1928 according to one or more alternative techniques, such as Hopfield learning rule, Boltzmann learning rule, Contrastive Divergence, Wake Sleep, Variational Inference, Maximum Likelihood, Maximum A Posteriori, Gibbs Sampling, and backpropagating reconstruction errors or hidden state reparameterizations.

Note that NPU 1944 need not necessarily be present in all ML model embodiments. In embodiments where ML models are present, any one or more of processor 1910, GPU 1942, and/or NPU 1944 can be present to train and/or execute MLM 1928.

One or more wireless modems 1960 can be coupled to antenna(s) (not shown) of computing device 1902 and can support two-way communications between processor 1910 and devices external to computing device 1902 through network 1904, as would be understood to persons skilled in the relevant art(s). Wireless modem 1960 is shown generically and can include a cellular modem 1966 for communicating with one or more cellular networks, such as a GSM network for data and voice communications within a single cellular network, between cellular networks, or between the mobile device and a public switched telephone network (PSTN). In examples, wireless modem 1960 also or alternatively includes other radio-based modem types, such as a Bluetooth modem 1964 (also referred to as a "Bluetooth device") and/or Wi-Fi modem 1962 (also referred to as an "wireless adaptor"). Wi-Fi modem 1962 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1964 is configured to communicate with another Bluetooth-capable device according to the Bluetooth short-range wireless technology standard(s) such as IEEE 802.15.1 and/or managed by the Bluetooth Special Interest Group (SIG).

Computing device 1902 can further include power supply 1982, LI receiver 1984, accelerometer 1986, and/or one or more wired interfaces 1980. Example wired interfaces 1980 include a USB port, IEEE 1394 (FireWire) port, a RS-192 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 1980 of computing device 1902 provide for wired connections between computing device 1902 and network 1904, or between computing device 1902 and one or more devices/peripherals when such devices/peripherals are external to computing device 1902 (e.g., a pointing device, display 1954, speaker 1952, camera 1936, physical keyboard 1938, etc.). Power supply 1982 is configured to supply power to each of the components of computing device 1902 and receives power from a battery internal to computing device 1902, and/or from a power cord plugged into a power port of computing device 1902 (e.g., a USB port, an A/C power port). LI receiver 1984 is useable for location determination of computing device 1902 and in examples includes a satellite navigation receiver such as a Global Positioning System (GPS) receiver and/or includes other type of location determiner configured to determine location of computing device 1902 based on received information (e.g., using cell tower triangulation, etc.). Accelerometer 1986, when present, is configured to determine an orientation of computing device 1902.

Note that the illustrated components of computing device 1902 are not required or all-inclusive, and fewer or greater numbers of components can be present as would be recognized by one skilled in the art. In examples, computing device 1902 includes one or more of a gyroscope, barometer, proximity sensor, ambient light sensor, digital compass, etc. In an example, processor 1910 and memory 1956 are co-located in a same semiconductor device package, such as being included together in an integrated circuit chip, FPGA, or system-on-chip (SOC), optionally along with further components of computing device 1902.

In embodiments, computing device 1902 is configured to implement any of the above-described features of flowcharts herein. Computer program logic for performing any of the operations, steps, and/or functions described herein is stored in storage 1920 and executed by processor 1910.

In some embodiments, server infrastructure 1970 is present in computing environment 1900 and is communicatively coupled with computing device 1902 via network 1904. Server infrastructure 1970, when present, is a network-accessible server set (e.g., a cloud-based environment or platform). As shown in FIG. 19, server infrastructure 1970 includes clusters 1972. Each of clusters 1972 comprises a group of one or more compute nodes and/or a group of one or more storage nodes. For example, as shown in FIG. 19, cluster 1972 includes nodes 1974. Each of nodes 1974 are accessible via network 1904 (e.g., in a "cloud-based" embodiment) to build, deploy, and manage applications and services. In examples, any of nodes 1974 is a storage node that comprises a plurality of physical storage disks, SSDs, and/or other physical storage devices that are accessible via network 1904 and are configured to store data associated with the applications and services managed by nodes 1974.

Each of nodes 1974, as a compute node, comprises one or more server computers, server systems, and/or computing devices. For instance, a node 1974 in accordance with an embodiment includes one or more of the components of computing device 1902 disclosed herein. Each of nodes 1974 is configured to execute one or more software applications (or "applications") and/or services and/or manage hardware resources (e.g., processors, memory, etc.), which are utilized by users (e.g., customers) of the network-accessible server set. In examples, as shown in FIG. 19, nodes 1974 includes a node 1946 that includes storage 1948 and/or one or more of a processor 1958 (e.g., similar to processor 1910, GPU 1942, and/or NPU 1944 of computing device 1902). Storage 1948 stores application programs 1976 and application data 1978. Processor(s) 1958 operate application programs 1976 which access and/or generate related application data 1978. In an implementation, nodes such as node 1946 of nodes 1974 operate or comprise one or more virtual machines, with each virtual machine emulating a system architecture (e.g., an operating system), in an isolated manner, upon which applications such as application programs 1976 are executed.

In embodiments, one or more of clusters 1972 are located/co-located (e.g., housed in one or more nearby buildings with associated components such as backup power supplies, redundant data communications, environmental controls, etc.) to form a datacenter, or are arranged in other manners. Accordingly, in an embodiment, one or more of clusters 1972 are included in a datacenter in a distributed collection of datacenters. In embodiments, exemplary computing environment 1900 comprises part of a cloud-based platform.

In an embodiment, computing device 1902 accesses application programs 1976 for execution in any manner, such as by a client application and/or a browser at computing device 1902.

In an example, for purposes of network (e.g., cloud) backup and data security, computing device 1902 additionally and/or alternatively synchronizes copies of application programs 1914 and/or application data 1916 to be stored at network-based server infrastructure 1970 as application programs 1976 and/or application data 1978. In examples, operating system 1912 and/or application programs 1914 include a file hosting service client configured to synchronize applications and/or data stored in storage 1920 at network-based server infrastructure 1970.

In some embodiments, on-premises servers 1992 are present in computing environment 1900 and are communicatively coupled with computing device 1902 via network 1904. On-premises servers 1992, when present, are hosted within an organization's infrastructure and, in many cases, physically onsite of a facility of that organization. On-premises servers 1992 are controlled, administered, and maintained by IT (Information Technology) personnel of the organization or an IT partner to the organization. Application data 1998 can be shared by on-premises servers 1992 between computing devices of the organization, including computing device 1902 (when part of an organization) through a local network of the organization, and/or through further networks accessible to the organization (including the Internet). Furthermore, in examples, on-premises servers 1992 serve applications such as application programs 1996 to the computing devices of the organization, including computing device 1902. Accordingly, in examples, on-premises servers 1992 include storage 1994 (which includes one or more physical storage devices such as storage disks and/or SSDs) for storage of application programs 1996 and application data 1998 and include a processor 1990 (e.g., similar to processor 1910, GPU 1942, and/or NPU 1944 of computing device 1902) for execution of application programs 1996. In some embodiments, multiple processors 1990 are present for execution of application programs 1996 and/or for other purposes. In further examples, computing device 1902 is configured to synchronize copies of application programs 1914 and/or application data 1916 for backup storage at on-premises servers 1992 as application programs 1996 and/or application data 1998.

Embodiments described herein may be implemented in one or more of computing device 1902, network-based server infrastructure 1970, and on-premises servers 1992. For example, in some embodiments, computing device 1902 is used to implement systems, clients, or devices, or components/subcomponents thereof, disclosed elsewhere herein. In other embodiments, a combination of computing device 1902, network-based server infrastructure 1970, and/or on-premises servers 1992 is used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 1920. Such computer-readable media and/or storage media are distinguished from and non-overlapping with communication media, propagating signals, and signals per se. Stated differently, "computer program medium," "computer-readable medium," "computer-readable storage medium," and "computer-readable storage device" do not encompass communication media, propagating signals, and signals per se. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 1914) are stored in storage 1920. Such computer programs can also be received via wired interface(s) 1960 and/or wireless modem(s) 1960 over network 1904. Such computer programs, when executed or loaded by an application, enable computing device 1902 to implement features of embodiments discussed herein. Accordingly, such computer programs represent controllers of the computing device 1902.

Embodiments are also directed to computer program products comprising computer code or instructions stored on any computer-readable medium or computer-readable storage medium. Such computer program products include the physical storage of storage 1920 as well as further physical storage types.

VIII. Additional Exemplary Embodiments

A system is described herein. The system comprises a processor, a network adapter, and a memory comprising programming instructions. The programming instructions structured to cause the network adapter to: receive a first graphic data frame, transmit the first graphic data frame to the processor, receive a second graphic data frame, determine that a first level of similarity between at least a first portion of the second graphic data frame and at least a first portion of the first graphic data frame satisfies a threshold condition, and prevent transmission of at least the first portion of the second graphic data frame to the processor.

In a further embodiment of the foregoing system, the network adapter receives the second graphic data frame subsequent to the processor entering a low-power state.

In a further embodiment of the foregoing system, to determine the first level of similarity, the programming instructions are further structured to cause the network adapter to: determine a level of similarity between an entirety of the second graphic data frame and an entirety of the first graphic data frame.

In a further embodiment of the foregoing system, to determine the first level of similarity, the programming instructions are further structured to cause the network adapter to: determine a level of similarity between a first sub-portion of the second graphic data frame and a first sub-portion of the first graphic data frame, wherein the first sub-portion of the second graphic data frame excludes a second sub-portion of the second graphic data frame and the first sub-portion of the first graphic data frame excludes a second portion of the first graphic data frame.

In a further embodiment of the foregoing system, the first graphic data frame comprises multiple first sub-portions, the second graphic data frame comprises multiple second sub-portions, and to determine the first level of similarity, the programming instructions are further structured to cause the network adapter to: for each second sub-portion of the second sub-portions, determine a level of similarity between the second sub-portion and a corresponding first sub-portion of the first sub-portions.

In a further embodiment of the foregoing system, wherein to prevent transmission of at least the first portion of the second graphic data frame, the programming instructions are further structured to cause the network adapter to prevent transmission of the entirety of the second graphic data frame.

In a further embodiment of the foregoing system, wherein to prevent transmission of at least the first portion of the second graphic data frame, the programming instructions are further structured to cause the network adapter to prevent transmission of the first portion of the second graphic data frame and cause a second portion of the second graphic data frame to be transmitted to the processor.

In a further embodiment of the foregoing system, wherein the programming instructions are further structured to cause the network adapter to: determine that a level of similarity between the second portion of the second graphic data frame and a corresponding second portion of the first graphic data frame fails to satisfy the threshold condition.

In a further embodiment of the foregoing system, wherein transmission of the second portion of the second graphic data frame to the processor causes the processor to enter a high power state and the programming instructions are further structured to cause the network adapter to: receive a third graphic data frame subsequent to the processor re-entering the low-power state; determine that a second level of similarity between the third graphic data frame and the second graphic data frame fails to satisfy the threshold condition; and transmit the third graphic data frame to the processor. Wherein an amount of time the processor is in a high power state subsequent to receiving the second graphic data frame is less than an amount of time the processor is in the high power state subsequent to receiving the third graphic data frame.

In a further embodiment of the foregoing system, the programming instructions are further structured to cause the network adapter to: receive a third graphic data frame; determine that a second level of similarity between the third graphic data frame and at least one of the first or the second graphic data frame fails to satisfy the threshold condition; cause the processor to enter a high power state; and transmit the third graphic data frame to the processor.

In a further embodiment of the foregoing system, wherein to cause the processor to enter a high power state, the programming instructions are further structured to cause the network adapter to apply a voltage to a pin of the processor.

In a further embodiment of the foregoing system, wherein to determine the first level of similarity between the second graphic data frame and the first graphic data frame, the programming instructions are further structured to cause the network adapter to compare pixels of the first graphic data frame to pixels of the second graphic data frame.

In a further embodiment of the foregoing system, wherein the memory comprises a buffer and the programming instructions are further structured to cause the network adapter to: generate a first hash of the first graphic data frame; store the first hash in the buffer; generate a second hash of the second graphic data frame; and compare the first hash to the second hash to determine the first level of similarity between the second graphic data frame and the first graphic data frame.

In a further embodiment of the foregoing system, wherein the first graphic data frame comprises multiple first sub-frames, the second graphic data frame comprises multiple second sub-frames, and the programming instructions are further structured to cause the network adapter to: generate a sub-hash for each of the first sub-frames; generate a sub-hash for each of the second sub-frames; and compare the sub-hashes of the first sub-frames to corresponding sub-hashes of the second sub-frames to determine the first level of similarity between the second graphic data frame and the first graphic data frame.

In a further embodiment of the foregoing system, wherein to determine the first level of similarity between the second graphic data frame and the first graphic data frame, the programming instructions are further structured to cause the network adapter to: provide the first graphic data frame to a machine learning (ML) model to cause the ML model to encode the first graphic data frame; provide the second graphic data frame to the ML model to cause the ML model to encode the second graphic data frame; and receive, from the ML model, the level of similarity between the second graphic data frame and the first graphic data frame.

In a further embodiment of the foregoing system, wherein to determine the first level of similarity between the second graphic data frame and the first graphic data frame, the programming instructions are further structured to cause the network adapter to: provide the first graphic data frame to a machine learning (ML) model to cause the ML model to encode the first graphic data frame; provide the second graphic data frame to the ML model to cause the ML model to encode the second graphic data frame; receive, from the ML model, the encoded version of the first graphic data frame and the encoded version of the second graphic data frame; and determine the first level of similarity between the encoded versions of the first and second graphic data frames.

In a further embodiment of the foregoing system, wherein the memory comprises the ML model.

In a further embodiment of the foregoing system, wherein the programming instructions are further structured to cause the network adapter to receive, from the processor, an indication that the processor is in a low-power state.

In a further embodiment of the foregoing system, wherein the network adapter and the memory are co-packaged in a first integrated circuit chip and the processor is packaged in a second integrated circuit chip physically separate from the first integrated circuit chip.

A method performed by a hardware network adapter of a computing device is described herein. The method comprises: receiving a first graphic data frame; transmitting the first graphic data frame to a processor of the computing device; receiving a second graphic data frame; determine that a first level of similarity between at least a first portion of the second graphic data frame and at least a first portion of the first graphic data frame satisfies a threshold condition; and preventing transmission of at least the first portion of the second graphic data frame to the processor.

In a further embodiment of the foregoing method, the method further comprises receiving the second graphic data frame subsequent to the processor entering a low-power state.

In a further embodiment of the foregoing method, the method further comprises determining the first level of similarity.

In a further embodiment of the foregoing method, said determining the first level of similarity comprises: determining a level of similarity between an entirety of the second graphic data frame and an entirety of the first graphic data frame.

In a further embodiment of the foregoing method, said determining the first level of similarity comprises: determining a level of similarity between a first sub-portion of the second graphic data frame and a first sub-portion of the first graphic data frame, wherein the first sub-portion of the second graphic data frame excludes a second sub-portion of the second graphic data frame and the first sub-portion of the first graphic data frame excludes a second portion of the first graphic data frame.

In a further embodiment of the foregoing method, the first graphic data frame comprises multiple first sub-portions, the second graphic data frame comprises multiple second sub-portions, and said determining the first level of similarity comprises: for each second sub-portion of the second sub-portions, determining a level of similarity between the second sub-portion and a corresponding first sub-portion of the first sub-portions.

In a further embodiment of the foregoing method, said preventing transmission of at least the first portion of the second graphic data frame comprises preventing transmission of the entirety of the second graphic data frame.

In a further embodiment of the foregoing method, said preventing transmission of at least the first portion of the second graphic data frame comprises: preventing transmission of the first portion of the second graphic data frame; and causing a second portion of the second graphic data frame to be transmitted to the processor.

In a further embodiment of the foregoing method, the method further comprises: determining a level of similarity between the second portion of the second graphic data frame and a corresponding second portion of the first graphic data frame fails to satisfy the threshold condition.

In a further embodiment of the foregoing method, said transmitting the second portion of the second graphic data frame to the processor causes the processor to enter a high power state and the method further comprises: receiving a third graphic data frame subsequent to the processor re-entering the low-power state; determining a second level of similarity between the third graphic data frame and the second graphic data frame fails to satisfy the threshold condition; and transmitting the third graphic data frame to the processor. Wherein an amount of time the processor is in a high power state subsequent to receiving the second graphic data frame is less than an amount of time the processor is in the high power state subsequent to receiving the third graphic data frame.

In a further embodiment of the foregoing method, the method further comprises: receiving a third graphic data frame; determining a second level of similarity between the third graphic data frame and at least one of the first or the second graphic data frame fails to satisfy the threshold condition; causing the processor to enter a high power state; and transmit the third graphic data frame to the processor.

In a further embodiment of the foregoing method, said causing the processor to enter a high power state comprises applying a voltage to a pin of the processor.

In a further embodiment of the foregoing method, said determining the first level of similarity between the second graphic data frame and the first graphic data frame comprises comparing pixels of the first graphic data frame to pixels of the second graphic data frame.

In a further embodiment of the foregoing method, the computing device comprises memory comprising a buffer. The method further comprises: generating a first hash of the first graphic data frame; storing the first hash in the buffer; generating a second hash of the second graphic data frame; and comparing the first hash to the second hash to determine the first level of similarity between the second graphic data frame and the first graphic data frame.

In a further embodiment of the foregoing method, the first graphic data frame comprises multiple first sub-frames, the second graphic data frame comprises multiple second sub-frames, and the method further comprises: generating a sub-hash for each of the first sub-frames; generating a sub-hash for each of the second sub-frames; and comparing the sub-hashes of the first sub-frames to corresponding sub-hashes of the second sub-frames to determine the first level of similarity between the second graphic data frame and the first graphic data frame.

In a further embodiment of the foregoing method, said determining the first level of similarity between the second graphic data frame and the first graphic data frame comprises: providing the first graphic data frame to a machine learning (ML) model to cause the ML model to encode the first graphic data frame; providing the second graphic data frame to the ML model to cause the ML model to encode the second graphic data frame; and receiving, from the ML model, the level of similarity between the second graphic data frame and the first graphic data frame.

In a further embodiment of the foregoing method, wherein said determining the first level of similarity between the second graphic data frame and the first graphic data frame comprises: providing the first graphic data frame to a machine learning (ML) model to cause the ML model to encode the first graphic data frame; providing the second graphic data frame to the ML model to cause the ML model to encode the second graphic data frame; receiving, from the ML model, the encoded version of the first graphic data frame and the encoded version of the second graphic data frame; and determining the first level of similarity between the encoded versions of the first and second graphic data frames.

In a further embodiment of the foregoing method, the computing device comprises memory comprising the ML model.

In a further embodiment of the foregoing method, the method further comprises receiving, from the processor, an indication that the processor is in a low-power state.

In a further embodiment of the foregoing method, the network adapter is packaged in a first integrated circuit chip and the processor is packaged in a second integrated circuit chip physically separate from the first integrated circuit chip.

A network adapter is described herein. The network adapter is separate from and communicatively coupled to a processor of a computing device. The network adapter comprises a communication coprocessor and a memory comprising programming instructions structured to cause the communication coprocessor to: receive a first graphic data frame, transmit the first graphic data frame to the processor, receive a second graphic data frame, determine that a first level of similarity between at least a first portion of the second graphic data frame and at least a first portion of the first graphic data frame satisfies a threshold condition, and prevent transmission of at least the first portion of the second graphic data frame to the processor.

In a further embodiment of the foregoing network adapter, the network adapter receives the second graphic data frame subsequent to the processor entering a low-power state.

In a further embodiment of the foregoing network adapter, to determine the first level of similarity, the programming instructions are further structured to cause the communication coprocessor to to: determine a level of similarity between an entirety of the second graphic data frame and an entirety of the first graphic data frame.

In a further embodiment of the foregoing network adapter, to determine the first level of similarity, the programming instructions are further structured to cause the communication coprocessor to to: determine a level of similarity between a first sub-portion of the second graphic data frame and a first sub-portion of the first graphic data frame, wherein the first sub-portion of the second graphic data frame excludes a second sub-portion of the second graphic data frame and the first sub-portion of the first graphic data frame excludes a second portion of the first graphic data frame.

In a further embodiment of the foregoing network adapter, the first graphic data frame comprises multiple first sub-portions, the second graphic data frame comprises multiple second sub-portions, and to determine the first level of similarity, the programming instructions are further structured to cause the communication coprocessor to to: for each second sub-portion of the second sub-portions, determine a level of similarity between the second sub-portion and a corresponding first sub-portion of the first sub-portions.

In a further embodiment of the foregoing network adapter, wherein to prevent transmission of at least the first portion of the second graphic data frame, the programming instructions are further structured to cause the communication coprocessor to to prevent transmission of the entirety of the second graphic data frame.

In a further embodiment of the foregoing network adapter, wherein to prevent transmission of at least the first portion of the second graphic data frame, the programming instructions are further structured to cause the communication coprocessor to to prevent transmission of the first portion of the second graphic data frame and cause a second portion of the second graphic data frame to be transmitted to the processor.

In a further embodiment of the foregoing network adapter, wherein the programming instructions are further structured to cause the communication coprocessor to: determine that a level of similarity between the second portion of the second graphic data frame and a corresponding second portion of the first graphic data frame fails to satisfy the threshold condition.

In a further embodiment of the foregoing network adapter, wherein transmission of the second portion of the second graphic data frame to the processor causes the processor to enter a high power state and the programming instructions are further structured to cause the communication coprocessor to to: receive a third graphic data frame subsequent to the processor re-entering the low-power state; determine that a second level of similarity between the third graphic data frame and the second graphic data frame fails to satisfy the threshold condition; and transmit the third graphic data frame to the processor. Wherein an amount of time the processor is in a high power state subsequent to receiving the second graphic data frame is less than an amount of time the processor is in the high power state subsequent to receiving the third graphic data frame.

In a further embodiment of the foregoing network adapter, the programming instructions are further structured to cause the communication coprocessor to to: receive a third graphic data frame; determine that a second level of similarity between the third graphic data frame and at least one of the first or the second graphic data frame fails to satisfy the threshold condition; cause the processor to enter a high power state; and transmit the third graphic data frame to the processor.

In a further embodiment of the foregoing network adapter, wherein to cause the processor to enter a high power state, the programming instructions are further structured to cause the communication coprocessor to to apply a voltage to a pin of the processor.

In a further embodiment of the foregoing network adapter, wherein to determine the first level of similarity between the second graphic data frame and the first graphic data frame, the programming instructions are further structured to cause the communication coprocessor to to compare pixels of the first graphic data frame to pixels of the second graphic data frame.

In a further embodiment of the foregoing network adapter, wherein the memory comprises a buffer and the programming instructions are further structured to cause the communication coprocessor to to: generate a first hash of the first graphic data frame; store the first hash in the buffer; generate a second hash of the second graphic data frame; and compare the first hash to the second hash to determine the first level of similarity between the second graphic data frame and the first graphic data frame.

In a further embodiment of the foregoing network adapter, wherein the first graphic data frame comprises multiple first sub-frames, the second graphic data frame comprises multiple second sub-frames, and the programming instructions are further structured to cause the communication coprocessor to to: generate a sub-hash for each of the first sub-frames; generate a sub-hash for each of the second sub-frames; and compare the sub-hashes of the first sub-frames to corresponding sub-hashes of the second sub-frames to determine the first level of similarity between the second graphic data frame and the first graphic data frame.

In a further embodiment of the foregoing network adapter, wherein to determine the first level of similarity between the second graphic data frame and the first graphic data frame, the programming instructions are further structured to cause the communication coprocessor to to: provide the first graphic data frame to a machine learning (ML) model to cause the ML model to encode the first graphic data frame; provide the second graphic data frame to the ML model to cause the ML model to encode the second graphic data frame; and receive, from the ML model, the level of similarity between the second graphic data frame and the first graphic data frame.

In a further embodiment of the foregoing network adapter, wherein to determine the first level of similarity between the second graphic data frame and the first graphic data frame, the programming instructions are further structured to cause the communication coprocessor to to: provide the first graphic data frame to a machine learning (ML) model to cause the ML model to encode the first graphic data frame; provide the second graphic data frame to the ML model to cause the ML model to encode the second graphic data frame; receive, from the ML model, the encoded version of the first graphic data frame and the encoded version of the second graphic data frame; and determine the first level of similarity between the encoded versions of the first and second graphic data frames.

In a further embodiment of the foregoing network adapter, wherein the memory comprises the ML model.

In a further embodiment of the foregoing network adapter, wherein the programming instructions are further structured to cause the communication coprocessor to receive, from the processor, an indication that the processor is in a low-power state.

In a further embodiment of the foregoing network adapter, wherein the network adapter and the memory are co-packaged in a first integrated circuit chip and the processor is packaged in a second integrated circuit chip physically separate from the first integrated circuit chip.

A computer-readable storage medium encoded with program instructions structured to cause a network adapter (or a co-processor of a network adapter) to perform any of the foregoing embodiments of the foregoing method.

An alternative method performed using a network adapter of a source device or communicatively coupled to a source device is described herein. The method comprises: receiving a first graphic data frame; transmitting the first graphic data frame to a remotely located computing device; receiving a second graphic data frame; determining a first level of similarity between at least a first portion of the second graphic data frame and at least a first portion of the first graphic data frame satisfies a threshold condition; and preventing transmission of at least the first portion of the second graphic data frame to the remotely located computing device.

In a further embodiment of the foregoing alternative method, the alternative method further comprises receiving the second graphic data frame subsequent to a processor of the remotely located computing device entering a low-power state.

In a further embodiment of the foregoing alternative method, the alternative method further comprises determining the first level of similarity.

In a further embodiment of the foregoing alternative method, said determining the first level of similarity comprises: determining a level of similarity between an entirety of the second graphic data frame and an entirety of the first graphic data frame.

In a further embodiment of the foregoing alternative method, said determining the first level of similarity comprises: determining a level of similarity between a first sub-portion of the second graphic data frame and a first sub-portion of the first graphic data frame, wherein the first sub-portion of the second graphic data frame excludes a second sub-portion of the second graphic data frame and the first sub-portion of the first graphic data frame excludes a second portion of the first graphic data frame.

In a further embodiment of the foregoing alternative method, the first graphic data frame comprises multiple first sub-portions, the second graphic data frame comprises multiple second sub-portions, and said determining the first level of similarity comprises: for each second sub-portion of the second sub-portions, determining a level of similarity between the second sub-portion and a corresponding first sub-portion of the first sub-portions.

In a further embodiment of the foregoing alternative method, said preventing transmission of at least the first portion of the second graphic data frame comprises preventing transmission of the entirety of the second graphic data frame.

In a further embodiment of the foregoing alternative method, said preventing transmission of at least the first portion of the second graphic data frame comprises: preventing transmission of the first portion of the second graphic data frame; and causing a second portion of the second graphic data frame to be transmitted to the remotely located computing device.

In a further embodiment of the foregoing alternative method, the alternative method further comprises: determining a level of similarity between the second portion of the second graphic data frame and a corresponding second portion of the first graphic data frame fails to satisfy the threshold condition.

In a further embodiment of the foregoing alternative method, said transmitting the second portion of the second graphic data frame to the remotely located computing device causes the processor of the remotely located computing device to enter a high power state and the alternative method further comprises: receiving a third graphic data frame subsequent to the processor re-entering the low-power state; determining a second level of similarity between the third graphic data frame and the second graphic data frame fails to satisfy the threshold condition; and transmitting the third graphic data frame to the processor. Wherein an amount of time the processor is in a high power state subsequent to receiving the second graphic data frame is less than an amount of time the processor is in the high power state subsequent to receiving the third graphic data frame.

In a further embodiment of the foregoing alternative method, the alternative method further comprises: receiving a third graphic data frame; determining a second level of similarity between the third graphic data frame and at least one of the first or the second graphic data frame fails to satisfy the threshold condition; causing the processor to enter a high power state; and transmitting the third graphic data frame to the remotely located computing device.

In a further embodiment of the foregoing alternative method, said causing the processor to enter a high power state comprises causing a network adapter of the remotely located computing device to apply a voltage to a pin of the processor.

In a further embodiment of the foregoing alternative method, said determining the first level of similarity between the second graphic data frame and the first graphic data frame comprises comparing pixels of the first graphic data frame to pixels of the second graphic data frame.

In a further embodiment of the foregoing alternative method, the network adapter comprises memory comprising a buffer. The alternative method further comprises: generating a first hash of the first graphic data frame; storing the first hash in the buffer; generating a second hash of the second graphic data frame; and comparing the first hash to the second hash to determine the first level of similarity between the second graphic data frame and the first graphic data frame.

In a further embodiment of the foregoing alternative method, the first graphic data frame comprises multiple first sub-frames, the second graphic data frame comprises multiple second sub-frames, and the alternative method further comprises: generating a sub-hash for each of the first sub-frames; generating a sub-hash for each of the second sub-frames; and comparing the sub-hashes of the first sub-frames to corresponding sub-hashes of the second sub-frames to determine the first level of similarity between the second graphic data frame and the first graphic data frame.

In a further embodiment of the foregoing alternative method, said determining the first level of similarity between the second graphic data frame and the first graphic data frame comprises: providing the first graphic data frame to a machine learning (ML) model to cause the ML model to encode the first graphic data frame; providing the second graphic data frame to the ML model to cause the ML model to encode the second graphic data frame; and receiving, from the ML model, the level of similarity between the second graphic data frame and the first graphic data frame.

In a further embodiment of the foregoing alternative method, wherein said determining the first level of similarity between the second graphic data frame and the first graphic data frame comprises: providing the first graphic data frame to a machine learning (ML) model to cause the ML model to encode the first graphic data frame; providing the second graphic data frame to the ML model to cause the ML model to encode the second graphic data frame; receiving, from the ML model, the encoded version of the first graphic data frame and the encoded version of the second graphic data frame; and determining the first level of similarity between the encoded versions of the first and second graphic data frames.

In a further embodiment of the foregoing alternative method, the network adapter comprises memory comprising the ML model.

In a further embodiment of the foregoing alternative method, the alternative method further comprises receiving, from the remotely located computing device, an indication that the processor is in a low-power state.

A source system is described herein. The source system is communicatively coupled to a remotely located computing device (e.g., over a network (e.g., a cloud network, an enterprise network, etc.)). The source system comprises a content providing service, a source network adapter, and a memory comprising programming instructions. The programming instructions are structured to cause the source network adapter to perform any of the forgoing embodiments of the foregoing alternative method.

A source network adapter is described herein. The source network is communicatively coupled to a source device and a remotely located computing device. The source network adapter comprises a communication coprocessor and memory comprising programming instructions. The programming instructions are structured to cause the communication coprocessor to perform any of the foregoing embodiments of the foregoing alternative method.

A computer-readable storage medium encoded with program instructions structured to cause a source network adapter (or a co-processor of a source network adapter) to perform any of the foregoing embodiments of the foregoing alternative method.

IX. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Moreover, according to the described embodiments and techniques, any components of systems, computing devices, source devices, network adapters, processing units, and/or their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A system comprising:

a processor;

a network adapter physically separate from and communicatively coupled to the processor; and a memory comprising programming instructions structured to cause the network adapter to:

receive a first graphic data frame, transmit the first graphic data frame to the processor, causing the processor to process the first graphic data frame and cause a display to display the first graphic data frame, subsequent to the processor entering a low-power state, receive a second graphic data frame, determine that a first level of similarity between the second graphic data frame and the first graphic data frame satisfies a threshold condition without causing the processor to exit the low-power state, and prevent transmission of the second graphic data frame to the processor, the prevention of the transmission maintaining the processor in the low-power state.

2. The system of claim 1, wherein the programming instructions are further structured to cause the network adapter to:

receive a third graphic data frame;

determine that a second level of similarity between the third graphic data frame and at least one of the first or the second graphic data frame fails to satisfy the threshold condition;

cause the processor to enter a high power state; and transmit the third graphic data frame to the processor.

3. The system of claim 2, wherein to cause the processor to enter a high power state, the programming instructions are further structured to cause the network adapter to:

apply a voltage to a pin of the processor.

4. The system of claim 1, wherein to determine the first level of similarity between the second graphic data frame and the first graphic data frame, the programming instructions are further structured to cause the network adapter to:

compare pixels of the first graphic data frame to pixels of the second graphic data frame.

5. The system of claim 1, wherein the memory comprises a buffer and the programming instructions are further structured to cause the network adapter to:

generate a first hash of the first graphic data frame;

store the first hash in the buffer;

generate a second hash of the second graphic data frame; and compare the first hash to the second hash to determine the first level of similarity between the second graphic data frame and the first graphic data frame.

6. The system of claim 1, wherein the first graphic data frame comprises a first plurality of sub-frames, the second graphic data frame comprises a second plurality of sub-frames, and the programming instructions are further structured to cause the network adapter to:

generate a first sub-hash for a first sub-frame of the first plurality of sub-frames;

generate a second sub-hash for a second sub-frame of the first plurality of sub-frames;

generate a third sub-hash for a third sub-frame of the second plurality of sub-frames;

generate a fourth sub-hash for a fourth sub-frame of the second plurality of sub-frames;

compare the first sub-hash to the third sub-hash and the second sub-hash to the fourth sub-hash; and determine the first level of similarity between the second graphic data frame and the first graphic data frame satisfies the threshold condition based on the comparison of the first sub-hash to the third sub-hash and the second sub-hash to the fourth sub-hash.

7. The system of claim 1, wherein to determine the first level of similarity between the second graphic data frame and the first graphic data frame, the programming instructions are further structured to cause the network adapter to:

provide the first graphic data frame to a machine learning (ML) model to cause the ML model to encode the first graphic data frame;

provide the second graphic data frame to the ML model to cause the ML model to encode the second graphic data frame; and receive, from the ML model, the first level of similarity between the second graphic data frame and the first graphic data frame.

8. The system of claim 7, wherein the memory comprises the ML model.

9. The system of claim 1, wherein the programming instructions are further structured to cause the network adapter to:

receive, from the processor, an indication that the processor is in a low-power state.

10. The system of claim 1, wherein the network adapter and the memory are co-packaged in a first integrated circuit chip and the processor is packaged in a second integrated circuit chip physically separate from the first integrated circuit chip.

11. A method performed by a hardware network adapter of a computing device, the method comprising:

receiving a first graphic data frame;

transmitting the first graphic data frame to a processor of the computing device, the processor physically separate from and communicatively coupled to the hardware network adapter, said transmitting the first graphic data frame causing the processor to process the first graphic data frame and cause a display to display the first graphic data frame;

subsequent to the processor entering a low-power state, receiving a second graphic data frame;

determining, without causing the processor to exit the low-power state a first level of similarity between a first portion of the second graphic data frame and a corresponding first portion of the first graphic data frame satisfies a threshold condition; and preventing transmission of the first portion to the processor.

12. The method of claim 11, further comprising:

determining a second level of similarity between a second portion of the second graphic data frame and a corresponding second portion of the first graphic data frame fails to satisfy the threshold condition; and transmitting the second portion to the processor.

13. The method of claim 12, wherein said transmitting the second portion of the second graphic data frame to the processor causes the processor to enter a high power state, and the method further comprises:

receiving a third graphic data frame subsequent to the processor re-entering the low-power state;

determining a third level of similarity between the third graphic data frame and the second graphic data frame fails to satisfy the threshold condition; and transmitting the third graphic data frame to the processor, wherein an amount of time the processor is in a high power state subsequent to receiving the second graphic data frame is less than an amount of time the processor is in the high power state subsequent to receiving the third graphic data frame.

14. The method of claim 11, wherein said determining the first level of similarity comprises:

comparing pixels of the first graphic data frame to pixels of the second graphic data frame.

15. The method of claim 11, further comprising:

generating a first hash of the first graphic data frame;

storing the first hash in a buffer;

generating a second hash of the second graphic data frame; and comparing the first hash to the second hash to determine the first level of similarity.

16. The method of claim 11, wherein the first graphic data frame comprises multiple first sub-frames, the second graphic data frame comprises multiple second sub-frames, and the method further comprises:

generating a sub-hash for each of the first sub-frames;

generating a sub-hash for each of the second sub-frames; and comparing the sub-hashes of the first sub-frames to corresponding sub-hashes of the second sub-frames to determine the first level of similarity.

17. The method of claim 11, further comprising:

providing the first graphic data frame to a machine learning (ML) model to cause the ML model to encode the first graphic data frame;

providing the second graphic data frame to the ML model to cause the ML model to encode the second graphic data frame; and receiving, from the ML model, the first level of similarity between the second graphic data frame and the first graphic data frame.

18. A network adapter comprising:

a communication coprocessor; and a memory comprising programming instructions structured to cause the communication coprocessor to:

receive a first graphic data frame, transmit the first graphic data frame to a processor physically separate from and communicatively coupled to the network adapter, the transmission of the first graphic data frame causing the processor to process the first graphic data frame and cause a display to display the first graphic data frame, subsequent to the processor entering a low-power state, receive a second graphic data frame, determine, without causing the processor to exit the low-power state, that a first level of similarity between the second graphic data frame and the first graphic data frame satisfies a threshold condition, and prevent transmission of a first portion of the second graphic data frame to the processor, and transmit a second portion of the second graphic data frame to the processor.

19. The network adapter of claim 18, wherein the transmission of the second portion of the second graphic data frame causes the processor to enter a high power state and the programming instructions are further structured to cause the communication coprocessor to:

receive a third graphic data frame subsequent to the processor re-entering the low-power state;

determine that a third level of similarity between the third graphic data frame and the second graphic data frame fails to satisfy the threshold condition; and transmit the third graphic data frame to the processor, wherein an amount of time the processor is in a high power state subsequent to receiving the second graphic data frame is less than an amount of time the processor is in the high power state subsequent to receiving the third graphic data frame.

20. The network adapter of claim 18, wherein to determine the first level of similarity between the second graphic data frame and the first graphic data frame, the programming instructions are further structured to cause the communication coprocessor to:

provide the first graphic data frame to a machine learning (ML) model to cause the ML model to encode the first graphic data frame;

provide the second graphic data frame to the ML model to cause the ML model to encode the second graphic data frame; and receive, from the ML model, the first level of similarity between the second graphic data frame and the first graphic data frame.

* * * * *